US012684599B2

(12) United States Patent
Jin et al.

(10) Patent No.: US 12,684,599 B2
(45) Date of Patent: Jul. 14, 2026

(54) CHANNEL CONFIGURATION METHOD, AND APPARATUS

(71) Applicant: Huawei Technologies Co., Ltd., Shenzhen (CN)

(72) Inventors: Meng Jin, Shanghai (CN); Yao Zhao, Shanghai (CN); Jingyun Zhang, Shanghai (CN); Dongzhe Sun, Shanghai (CN); Yumin Li, Shanghai (CN); Xudong Zhu, Shanghai (CN); Hai Lian, Shenzhen (CN); Guanjun Ni, Shanghai (CN); Xiaofeng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 228 days.

(21) Appl. No.: 18/604,903

(22) Filed: Mar. 14, 2024

(65) Prior Publication Data
US 2024/0224300 A1     Jul. 4, 2024

Related U.S. Application Data

(63) Continuation of application No. PCT/CN2022/114013, filed on Aug. 22, 2022.

(30) Foreign Application Priority Data
Sep. 15, 2021     (CN) ........................... 202111081711.2

(51) Int. Cl.
*H04W 72/30*          (2023.01)
*H04W 4/80*           (2018.01)
(Continued)

(52) U.S. Cl.
CPC ............. *H04W 72/30* (2023.01); *H04W 4/80* (2018.02); *H04W 76/14* (2018.02); *H04W 88/06* (2013.01)

(58) Field of Classification Search
None
See application file for complete search history.

(56) References Cited

U.S. PATENT DOCUMENTS

2020/0389196 A1   12/2020  Choi et al.
2024/0276565 A1*   8/2024  Li ............................ H04W 4/80
(Continued)

FOREIGN PATENT DOCUMENTS

CN         113259970 A      8/2021
JP         2021503727 A      2/2021
(Continued)

*Primary Examiner* — Christopher M Crutchfield
(74) *Attorney, Agent, or Firm* — Slater Matsil, LLP

(57)          ABSTRACT
A method includes: A basic application layer sends first information that includes a first business requirement and a first port to a basic service layer. The basic service layer sends second information that includes the first business requirement, a first broadcast business channel, and a logical channel type to an access layer. The first broadcast business channel is determined based on the first information. The access layer supports a first access technology that is determined, based on the first business requirement, from a plurality of access technologies supported by the access layer. The access layer sends a first mapping relationship that indicates the first broadcast business channel and a first logical channel to the basic service layer. The first logical channel is a logical channel that supports the first access technology and that is determined based on the second information.

20 Claims, 15 Drawing Sheets

(51) Int. Cl.
   *H04W 76/14*          (2018.01)
   *H04W 88/06*          (2009.01)

(56)          References Cited

U.S. PATENT DOCUMENTS

2024/0389128 A1 * 11/2024 Zhang ............... H04W 28/0215
2025/0133144 A1 *  4/2025 Wang ............... H04N 21/43637
2025/0175415 A1 *  5/2025 Zhang ..................... H04L 45/02
2025/0202985 A1 *  6/2025 Zhang ................... H04L 69/326

FOREIGN PATENT DOCUMENTS

JP        2022529032 A      6/2022
JP        2024539122 A     10/2024
WO        2020211714 A1    10/2020
WO     WO-2023045815 A1 *  3/2023    ............ H04W 72/21
WO        2023065813 A1     4/2023

* cited by examiner

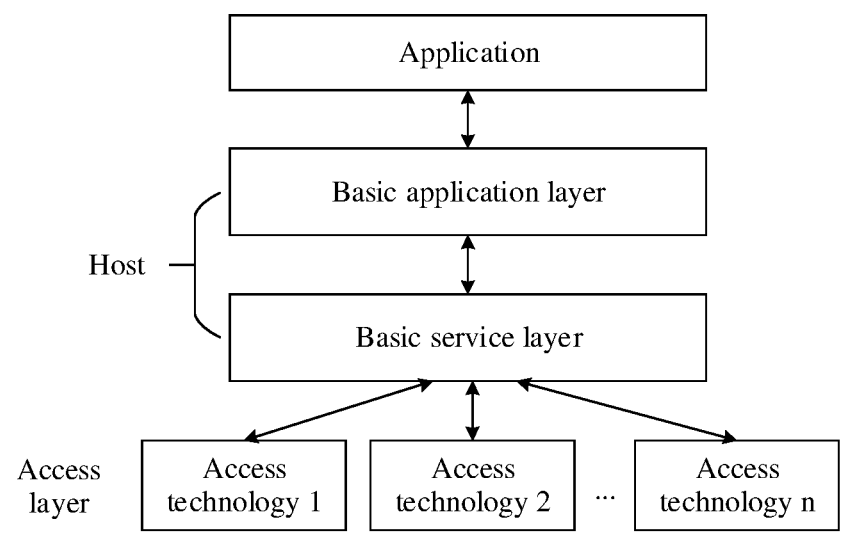
FIG. 1
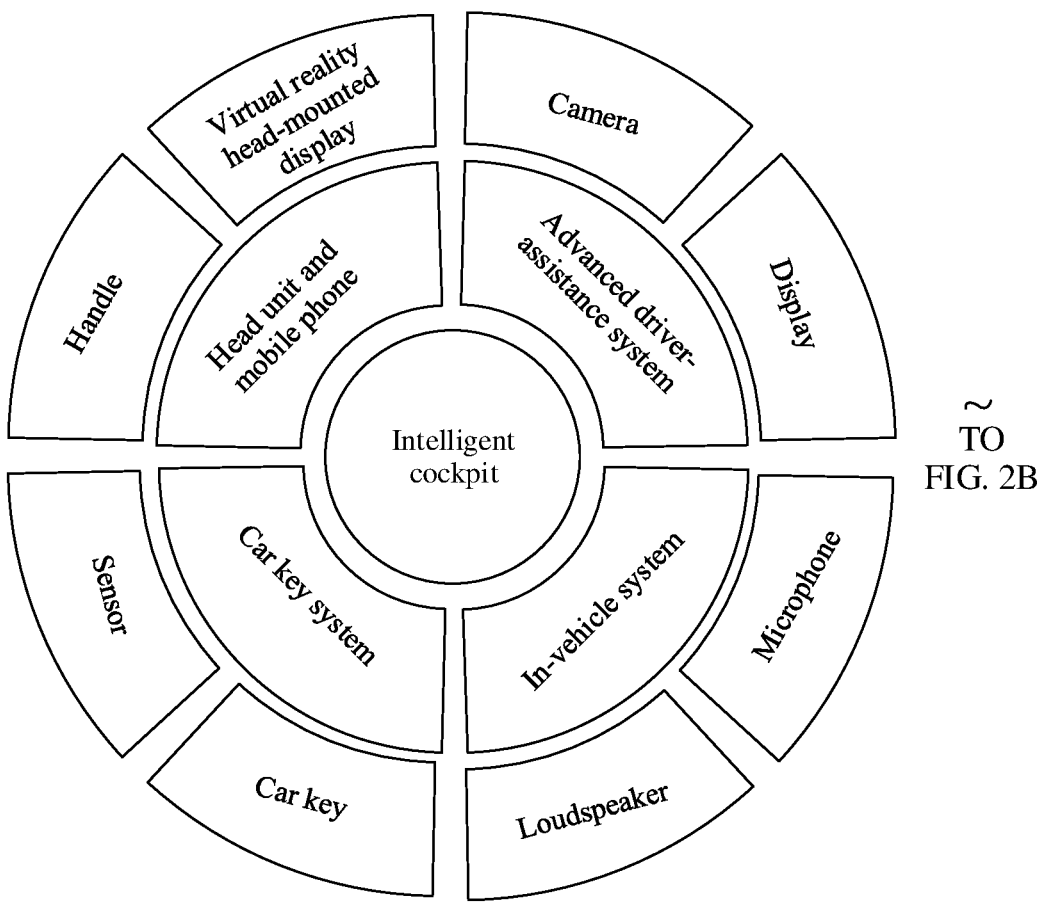
~
TO
FIG. 2B
FIG. 2A

CONT.
FROM

~

~
TO

CONT.
FROM

~

~
TO

CONT.
FROM

~

CONT.
FROM

~

Access layer

400

Communication
line 403

CHANNEL CONFIGURATION METHOD, AND APPARATUS

CROSS-REFERENCE TO RELATED APPLICATIONS

This application is a continuation of International Application No. PCT/CN2022/114013, filed on Aug. 22, 2022, which claims priority to Chinese Patent Application No. 202111081711.2, filed on Sep. 15, 2021. The disclosures of the aforementioned applications are hereby incorporated by reference in their entireties.

TECHNICAL FIELD

This application relates to the field of communication technologies, and in particular, to a channel configuration method and an apparatus.

BACKGROUND

In a conventional communication system, communication apparatuses may communicate with each other by using a wireless short-range communication technology, to implement sharing of information and wireless transmission of business. With proposal of new requirements and development of new technologies, the wireless short-range communication technology is also developing continuously. To meet requirements of industry-wide internet scenarios, the sparklink alliance (sparklink alliance) is established and is committed to promoting innovation and industry ecosystem of a next-generation wireless short-range communication technology, to support application in scenarios such as intelligent cockpits, smart homes, smartphones, and intelligent manufacturing, and meet corresponding performance requirements.

To support the next-generation wireless short-range communication technology and implement a complete procedure of wireless short-range business, designing of a channel for broadcast business needs to be performed under a brand-new protocol framework. Therefore, how to configure a channel for transmission of the broadcast business to implement compatibility with a plurality of access technologies becomes a technical problem to be urgently resolved.

SUMMARY

In view of this, embodiments of this application provide a channel configuration method and an apparatus, to configure a channel for transmission of broadcast business, so that the broadcast business can be transmitted through a configured channel, and a business requirement can be met. In addition, compatibility with a plurality of access technologies can be implemented, to improve flexibility of transmission of the broadcast business.

According to a first aspect, an embodiment of this application provides a channel configuration method. The method may be applied to a first device, the first device may include a basic application layer, a basic service layer, and an access layer, and the access layer may support a plurality of access technologies. The method may include: The basic service layer receives first information that includes a first business requirement and identification information of a first port and that is from the basic application layer. The basic service layer sends second information to the access layer. The second information includes the first business requirement, identification information of a first broadcast business channel, and a logical channel type. The first broadcast business channel is a transmission channel determined based on the first information. The logical channel type indicates a type of a logical channel. The access layer supports a first access technology that is determined from the plurality of access technologies based on the first business requirement. The basic service layer receives a first mapping relationship that includes the identification information of the first broadcast business channel and identification information of a first logical channel and that is from the access layer. The first logical channel is a logical channel that supports the first access technology and that is determined based on the second information. The basic service layer stores a second mapping relationship that includes the identification information of the first broadcast business channel and the identification information of the first port.

Based on the first aspect, the first device may configure channels that are used to transmit broadcast business and that include the first port, the first broadcast business channel, and the first logical channel, so that the broadcast business is transmitted through configured channels, and one-to-many broadcast business is implemented to meet a business requirement. In addition, the access layer of the first device may support the plurality of access technologies, so that flexibility of transmission of the broadcast business can be improved.

In a possible design, the first information further includes one or more of the following: a transmission channel type and first indication information, where the transmission channel type indicates that a type of the transmission channel is a broadcast business channel, and the first indication information indicates whether the transmission channel is dedicated to transmission of first business data.

Based on the possible design, the basic service layer may determine, based on the transmission channel type, the first broadcast business channel whose type is the broadcast business channel, to facilitate transmission of the broadcast business. When the first indication information indicates that the transmission channel is dedicated to transmission of the first business data, the basic service layer may establish the first broadcast business channel, so that the first broadcast business channel can be dedicated to transmission of the first business data. When the first indication information indicates that the transmission channel is not dedicated to transmission of the first business data, the basic service layer may establish or reuse the first broadcast business channel. When the basic service layer reuses the first broadcast business channel, the basic service layer may directly reuse the first broadcast business channel, or may reuse the first broadcast business channel in a reconfiguration manner, so as to meet the first business requirement and facilitate transmission of the first business data.

In a possible design, before the basic service layer sends the second information to the access layer, the method further includes: The basic service layer establishes the first broadcast business channel based on the first information; the basic service layer reconfigures the first broadcast business channel based on the first information; or the basic service layer reuses the first broadcast business channel based on the first information.

Based on the possible design, the basic service layer may establish or reuse the first broadcast business channel. When the basic service layer reuses the first broadcast business channel, the basic service layer may directly reuse the first broadcast business channel, or may reuse the first broadcast business channel in a reconfiguration manner. A plurality of feasible solutions are provided for the basic service layer to determine the first broadcast business channel.

In a possible design, the second information further includes one or more of the following: second indication information and third indication information, where the second indication information indicates the first access technology, and the third indication information indicates whether the logical channel is dedicated to transmission of the first business data.

Based on the possible design, by indicating the first access technology, the basic service layer may enable the access layer to transmit the broadcast business based on the first access technology. The basic service layer may further indicate the third indication information to the access layer. When the third indication information indicates that the logical channel is dedicated to transmission of the first business data, the access layer may establish the first logical channel, so that the first logical channel can be dedicated to transmission of the first business data. When the third indication information indicates that the logical channel is not dedicated to transmission of the first business data, the access layer may establish or reuse the first logical channel. When the access layer reuses the first logical channel, the access layer may indicate to reuse the first logical channel, or may reuse the first logical channel in a reconfiguration manner, so as to meet the first business requirement and facilitate transmission of the first business data.

In a possible design, the basic service layer receives third information from the basic application layer. The third information may include first business information, the identification information of the first port, and the identification information of the first broadcast business channel. The basic service layer sends fourth information to the access layer. The fourth information may include the first business information, the identification information of the first port, the identification information of the first broadcast business channel, and the identification information of the first logical channel. The basic service layer receives fourth indication information from the access layer. The fourth indication information may indicate that the access layer has completed broadcasting of the fourth information. The basic service layer sends the fourth indication information to the basic application layer.

Based on the possible design, the basic service layer may send, based on the third information sent by the basic application layer, the fourth information that includes the business information and information about the configured channels to the access layer, so that the access layer broadcasts the fourth information. After broadcasting the fourth information, the access layer may further send the fourth indication information to the basic service layer, to indicate that broadcasting of the fourth information has been completed. The basic service layer then reports the fourth indication information to the basic application layer. After obtaining the fourth indication information, the basic application layer may broadcast the first business data sequentially through the basic application layer, the basic service layer, and the access layer based on the configured channels, to complete transmission of the broadcast business.

In a possible design, the first business information includes one or more of the following: a business type, a business name, and a business description.

Based on the possible design, the first business information is broadcast, so that a scanning party communication device can determine, based on the business information, whether to configure a channel for the business and receive data of the business. If the scanning party communication device determines, based on the business information, that the data of the business needs to be obtained, a corresponding channel may be configured for the business, so as to receive the data of the business.

In a possible design, the basic service layer receives first business data from the basic application layer through the first port. The basic service layer sends the first business data to the access layer through the first broadcast business channel, to enable the access layer to broadcast the first business data through the first logical channel.

Based on the possible design, the basic application layer, the basic service layer, and the access layer may complete broadcasting of the first business data sequentially through the configured channels that include the first port, the first broadcast business channel, and the first logical channel.

In a possible design, the basic service layer receives fifth indication information from the basic application layer, and sends the fifth indication information to the access layer. The fifth indication information indicates to stop broadcasting the identification information of the first broadcast business channel.

Based on the possible design, the basic service layer may further send the fifth indication information sent by the basic application layer to the access layer, so that the access layer stops broadcasting the identification information of the first broadcast business channel. Then, no new scanning party communication device configures a channel based on the first broadcast business channel and receives the first business data. It should be noted that, after the access layer stops broadcasting the identification information of the first broadcast business channel, a scanning party communication device that has been configured with a channel may still receive, on a configured channel, the first business data broadcast by the first device through a channel configured by the first device.

In a possible design, the basic service layer receives sixth indication information from the basic application layer. The sixth indication information indicates to release a transmission channel corresponding to the first port. The basic service layer releases the first broadcast business channel based on the sixth indication information and the second mapping relationship. The basic service layer sends seventh indication information to the access layer. The seventh indication information indicates to release a logical channel corresponding to the first broadcast business channel, so that the access layer releases the first logical channel based on the seventh indication information and the first mapping relationship.

Based on the possible design, when the first device determines that transmission of the broadcast business needs to be stopped, the basic service layer may release, based on the sixth indication information sent by the basic application layer and the second mapping relationship, the first broadcast business channel corresponding to the first port. The basic service layer may further send the seventh indication information to the access layer, so that the access layer releases the first logical channel based on the seventh indication information and the first mapping relationship.

According to a second aspect, an embodiment of this application provides a communication apparatus. The communication apparatus can implement a function implemented by a basic service layer of the first device in the first aspect or the possible designs of the first aspect, and the function may be implemented by hardware executing corresponding software. The hardware or the software includes one or more modules corresponding to the foregoing function, for example, a transceiver module and a processing module. The transceiver module is configured to receive first information that includes a first business requirement and identification information of a first port and that is from a basic application layer. The transceiver module is further configured to send second information to an access layer. The second information includes the first business requirement, identification information of a first broadcast business channel, and a logical channel type. The first broadcast business channel is a transmission channel determined based on the first information. The logical channel type indicates a type of a logical channel. The access layer supports a first access technology that is determined from a plurality of access technologies based on the first business requirement. The transceiver module is further configured to receive a first mapping relationship that includes the identification information of the first broadcast business channel and identification information of a first logical channel and that is from the access layer. The first logical channel is a logical channel that supports the first access technology and that is determined based on the second information. The processing module is configured to store a second mapping relationship that includes the identification information of the first broadcast business channel and the identification information of the first port.

In a possible design, the first information further includes one or more of the following: a transmission channel type and first indication information, where the transmission channel type indicates that a type of the transmission channel is a broadcast business channel, and the first indication information indicates whether the transmission channel is dedicated to transmission of first business data.

In a possible design, the communication apparatus further includes the processing module. The processing module is configured to establish the first broadcast business channel based on the first information. Alternatively, the processing module is configured to reconfigure the first broadcast business channel based on the first information. Alternatively, the processing module is configured to reuse the first broadcast business channel based on the first information.

In a possible design, the second information further includes one or more of the following: second indication information and third indication information, where the second indication information indicates the first access technology, and the third indication information indicates whether the logical channel is dedicated to transmission of the first business data.

In a possible design, the transceiver module is further configured to receive third information from the basic application layer. The third information may include first business information, the identification information of the first port, and the identification information of the first broadcast business channel. The transceiver module is further configured to send fourth information to the access layer. The fourth information may include the first business information, the identification information of the first port, the identification information of the first broadcast business channel, and the identification information of the first logical channel. The transceiver module is further configured to receive fourth indication information from the access layer. The fourth indication information may indicate that the access layer has completed broadcasting of the fourth information. The transceiver module is further configured to send the fourth indication information to the basic application layer.

In a possible design, the first business information includes one or more of the following: a business type, a business name, and a business description.

In a possible design, the transceiver module is further configured to receive first business data from the basic application layer through the first port. The transceiver module is further configured to send the first business data to the access layer through the first broadcast business channel, to enable the access layer to broadcast the first business data through the first logical channel.

In a possible design, the transceiver module is further configured to: receive fifth indication information from the basic application layer, and send the fifth indication information to the access layer. The fifth indication information indicates to stop broadcasting the identification information of the first broadcast business channel.

In a possible design, the transceiver module is further configured to receive sixth indication information from the basic application layer. The sixth indication information indicates to release a transmission channel corresponding to the first port. The processing module is further configured to release the first broadcast business channel based on the sixth indication information and the second mapping relationship. The transceiver module is further configured to send seventh indication information to the access layer. The seventh indication information indicates to release a logical channel corresponding to the first broadcast business channel, so that the access layer releases the first logical channel based on the seventh indication information and the first mapping relationship.

It should be noted that, for a specific implementation of the communication apparatus, refer to a behavioral function of the basic service layer of the first device in the channel configuration method according to any one the first aspect or the possible designs of the first aspect. For technical effects brought by the communication apparatus, refer to the technical effects brought by any one of the possible designs of the first aspect. Details are not described again.

According to a third aspect, an embodiment of this application provides a communication apparatus. The communication apparatus may be a basic service layer of a first device or a chip or a system-on-a-chip at the basic service layer of the first device. The communication apparatus may implement a function performed by the basic service layer of the first device in the foregoing aspects or the possible designs, and the function may be implemented by hardware. In a possible design, the communication apparatus may include a transceiver and a processor. The transceiver and the processor may be configured to support the communication apparatus in implementing the function in any one of the first aspect or the possible designs of the first aspect. For example, the transceiver may be configured to receive first information that includes a first business requirement and identification information of a first port and that is from a basic application layer. The transceiver may be further configured to send second information to an access layer. The second information includes the first business requirement, identification information of a first broadcast business channel, and a logical channel type. The first broadcast business channel is a transmission channel determined based on the first information. The logical channel type indicates a type of a logical channel. The access layer supports a first access technology that is determined from a plurality of access technologies based on the first business requirement. The transceiver may be further configured to receive a first mapping relationship that includes the identification information of the first broadcast business channel and identification information of a first logical channel and that is from the access layer. The first logical channel is a logical channel that supports the first access technology and that is determined based on the second information. The processor may be configured to send a second mapping relationship that includes the identification information of the first broadcast business channel and the identification information of the first port to the basic application layer. In another possible design, the communication apparatus may further include a memory. The memory is configured to store computer-executable instructions and data that are necessary for the communication apparatus. When the communication apparatus runs, the transceiver and the processor execute the computer-executable instructions stored in the memory, so that the communication apparatus performs the channel configuration method according to any one of the first aspect or the possible designs of the first aspect.

For a specific implementation of the communication apparatus according to the third aspect, refer to the behavioral function of the basic service layer of the first device in the channel configuration method according to any one of the first aspect or the possible designs of the first aspect.

According to a fourth aspect, an embodiment of this application provides a channel configuration method. The method may be applied to a second device, the second device may include a basic application layer, a basic service layer, and an access layer, and the access layer may support a plurality of access technologies. The method may include: The basic service layer receives fourth information from the access layer, and reports the fourth information to the basic application layer. The fourth information includes first business information, identification information of a first port, identification information of a first broadcast business channel, and identification information of a first logical channel. The basic service layer receives fifth information from the basic application layer. The fifth information includes a first business requirement, identification information of a second port, the identification information of the first broadcast business channel, and the identification information of the first logical channel. There is a mapping relationship between the second port and the first port. The basic service layer sends sixth information to the access layer. The sixth information includes the first business requirement, identification information of a second broadcast business channel, the identification information of the first logical channel, and a logical channel type. The second broadcast business channel is a transmission channel determined based on the fifth information, and there is a mapping relationship between the second broadcast business channel and the first broadcast business channel. The logical channel type indicates a type of a logical channel. The access layer supports a first access technology, and the first access technology is determined from the plurality of access technologies based on the first business requirement. The basic service layer receives a third mapping relationship that includes the identification information of the second broadcast business channel and identification information of a second logical channel and that is from the access layer. The second logical channel is a logical channel that supports the first access technology and that is determined based on the sixth information, and there is a mapping relationship between the second logical channel and the first logical channel. The basic service layer stores a fourth mapping relationship that includes the identification information of the second port and the identification information of the second broadcast business channel.

Based on the fourth aspect, the second device may configure channels that are used to receive broadcast business and that include the second port, the second broadcast business channel, and the second logical channel, so that the broadcast business is received through configured channels, and one-to-many broadcast business is implemented to meet a business requirement. In addition, the access layer of the second device may support the plurality of access technologies, so that flexibility of transmission of the broadcast business can be improved.

In a possible design, the fifth information further includes one or more of the following: a transmission channel type and first indication information, where the transmission channel type indicates that a type of the transmission channel is a broadcast business channel, and the first indication information indicates whether the transmission channel is dedicated to transmission of first business data.

Based on the possible design, the basic service layer may determine, based on the transmission channel type, the second broadcast business channel whose type is the broadcast business channel, to facilitate receiving of the broadcast business. When the first indication information indicates that the transmission channel is dedicated to transmission of the first business data, the basic service layer may establish the second broadcast business channel, so that the second broadcast business channel can be dedicated to receiving of the first business data. When the first indication information indicates that the transmission channel is not dedicated to transmission of the first business data, the basic service layer may establish or reuse the second broadcast business channel. When the basic service layer reuses the second broadcast business channel, the basic service layer may directly reuse the second broadcast business channel, or may reuse the second broadcast business channel in a reconfiguration manner, so as to meet the first business requirement and facilitate receiving of the first business data.

In a possible design, before the basic service layer sends the sixth information to the access layer, the method further includes: The basic service layer establishes the second broadcast business channel based on the fifth information; the basic service layer reconfigures the second broadcast business channel based on the fifth information; or the basic service layer reuses the second broadcast business channel based on the fifth information.

Based on the possible design, the basic service layer may establish or reuse the second broadcast business channel. When the basic service layer reuses the second broadcast business channel, the basic service layer may directly reuse the second broadcast business channel, or may reuse the second broadcast business channel in a reconfiguration manner. A plurality of feasible solutions are provided for the basic service layer to determine the second broadcast business channel.

In a possible design, the sixth information further includes one or more of the following: second indication information and third indication information, where the second indication information indicates the first access technology, and the third indication information indicates whether the logical channel is dedicated to transmission of the first business data.

Based on the possible design, by indicating the first access technology, the basic service layer may enable the access layer to receive the broadcast business based on the first access technology. The basic service layer may further indicate the third indication information to the access layer. When the third indication information indicates that the logical channel is dedicated to transmission of the first business data, the access layer may establish the second logical channel, so that the second logical channel can be dedicated to receiving of the first business data. When the third indication information indicates that the logical channel is not dedicated to transmission of the first business data, the access layer may establish or reuse the second logical channel. When the access layer reuses the second logical channel, the access layer may directly reuse the second logical channel, or may reuse the second logical channel in a reconfiguration manner, so as to meet the first business requirement and facilitate receiving of the first business data.

In a possible design, the basic service layer receives, through the second broadcast business channel, first business data that is transmitted by the access layer through the second logical channel. The basic service layer sends the first business data to the basic application layer through the second port.

Based on the possible design, the access layer, the basic service layer, and the basic application layer may complete receiving of the first business data sequentially through the configured channels that include the second logical channel, the second broadcast business channel, and the second port.

In a possible design, the basic service layer receives eighth indication information from the basic application layer. The eighth indication information indicates to release a transmission channel corresponding to the second port. The basic service layer releases the second broadcast business channel based on the eighth indication information and the fourth mapping relationship. The basic service layer sends ninth indication information to the access layer. The ninth indication information indicates to release a logical channel corresponding to the second broadcast business channel, so that the access layer releases the second logical channel based on the ninth indication information and the third mapping relationship.

Based on the possible design, when the second device determines that transmission of the broadcast business needs to be stopped, the basic service layer may release, based on the eighth indication information sent by the basic application layer and the fourth mapping relationship, the second broadcast business channel corresponding to the second port. The basic service layer may further send the ninth indication information to the access layer, so that the access layer releases the second logical channel based on the ninth indication information and the third mapping relationship.

According to a fifth aspect, an embodiment of this application provides a communication apparatus. The communication apparatus can implement a function performed by a basic service layer of the second device in the fourth aspect or the possible design of the fourth aspect, and the function may be implemented by hardware executing corresponding software. The hardware or the software includes one or more modules corresponding to the foregoing function, for example, a transceiver module and a processing module. The transceiver module is configured to: receive fourth information from an access layer, and report the fourth information to a basic application layer. The fourth information includes first business information, identification information of a first port, identification information of a first broadcast business channel, and identification information of a first logical channel. The transceiver module is further configured to receive fifth information from the basic application layer. The fifth information includes a first business requirement, identification information of a second port, the identification information of the first broadcast business channel, and the identification information of the first logical channel. There is a mapping relationship between the second port and the first port. The transceiver module is further configured to send sixth information to the access layer. The sixth information includes the first business requirement, identification information of a second broadcast business channel, the identification information of the first logical channel, and a logical channel type. The second broadcast business channel is a transmission channel determined based on the fifth information, and there is a mapping relationship between the second broadcast business channel and the first broadcast business channel. The logical channel type indicates a type of a logical channel. The access layer supports a first access technology, and the first access technology is determined from a plurality of access technologies based on the first business requirement. The transceiver module is further configured to receive a third mapping relationship that includes the identification information of the second broadcast business channel and identification information of a second logical channel and that is from the access layer. The second logical channel is a logical channel that supports the first access technology and that is determined based on the sixth information, and there is a mapping relationship between the second logical channel and the first logical channel. The processing module is configured to store a fourth mapping relationship that includes the identification information of the second port and the identification information of the second broadcast business channel.

In a possible design, the fifth information further includes one or more of the following: a transmission channel type and first indication information, where the transmission channel type indicates that a type of the transmission channel is a broadcast business channel, and the first indication information indicates whether the transmission channel is dedicated to transmission of first business data.

In a possible design, the communication apparatus further includes the processing module. The processing module is configured to establish the second broadcast business channel based on the fifth information. Alternatively, the processing module is configured to reconfigure the second broadcast business channel based on the fifth information. Alternatively, the processing module is configured to reuse the second broadcast business channel based on the fifth information.

In a possible design, the sixth information further includes one or more of the following: second indication information and third indication information, where the second indication information indicates the first access technology, and the third indication information indicates whether the logical channel is dedicated to transmission of the first business data.

In a possible design, the transceiver module is further configured to receive, through the second broadcast business channel, first business data that is transmitted by the access layer through the second logical channel. The transceiver module is further configured to send the first business data to the basic application layer through the second port.

In a possible design, the transceiver module is further configured to receive eighth indication information from the basic application layer. The eighth indication information indicates to release a transmission channel corresponding to the second port. The processing module is further configured to release the second broadcast business channel based on the eighth indication information and the fourth mapping relationship. The transceiver module is further configured to send ninth indication information to the access layer. The ninth indication information indicates to release a logical channel corresponding to the second broadcast business channel, so that the access layer releases the second logical channel based on the ninth indication information and the third mapping relationship.

It should be noted that, for a specific implementation of the communication apparatus, refer to a behavioral function of the basic service layer of the second device in the channel configuration method according to any one of the fourth aspect or the possible designs of the fourth aspect. For technical effects brought by the communication apparatus, refer to the technical effects brought by any one of the possible designs of the second aspect. Details are not described again.

According to a sixth aspect, an embodiment of this application provides a communication apparatus. The communication apparatus may be a basic service layer of a second device or a chip or a system-on-a-chip at the basic service layer of the second device. The communication apparatus may implement a function performed by the basic service layer of the second device in the foregoing aspects or the possible designs, and the function may be implemented by hardware. In a possible design, the communication apparatus may include a transceiver and a processor. The transceiver and the processor may be configured to support the communication apparatus in implementing the function in any one of the first aspect or the possible designs of the first aspect. For example, the transceiver may be configured to: receive fourth information from an access layer, and report the fourth information to a basic application layer. The fourth information includes first business information, identification information of a first port, identification information of a first broadcast business channel, and identification information of a first logical channel. The transceiver may be further configured to receive fifth information from the basic application layer. The fifth information includes a first business requirement, identification information of a second port, the identification information of the first broadcast business channel, and the identification information of the first logical channel. There is a mapping relationship between the second port and the first port. The transceiver may be further configured to send sixth information to the access layer. The sixth information includes the first business requirement, identification information of a second broadcast business channel, the identification information of the first logical channel, and a logical channel type. The second broadcast business channel is a transmission channel determined based on the fifth information, and there is a mapping relationship between the second broadcast business channel and the first broadcast business channel. The logical channel type indicates a type of a logical channel. The access layer supports a first access technology, and the first access technology is determined from a plurality of access technologies based on the first business requirement. The transceiver may be further configured to receive a third mapping relationship that includes the identification information of the second broadcast business channel and identification information of a second logical channel and that is from the access layer. The second logical channel is a logical channel that supports the first access technology and that is determined based on the sixth information, and there is a mapping relationship between the second logical channel and the first logical channel. The processor may be configured to store a fourth mapping relationship that includes the identification information of the second port and the identification information of the second broadcast business channel. In another possible design, the communication apparatus may further include a memory. The memory is configured to store computer-executable instructions and data that are necessary for the communication apparatus. When the communication apparatus runs, the transceiver and the processor execute the computer-executable instructions stored in the memory, so that the communication apparatus performs the channel configuration method according to any one of the first aspect or the possible designs of the first aspect.

For a specific implementation of the communication apparatus according to the sixth aspect, refer to the behavioral function of the basic service layer of the second device in the channel configuration method according to any one of the fourth aspect or the possible designs of the fourth aspect.

According to a seventh aspect, an embodiment of this application provides a communication apparatus. The communication apparatus includes one or more processors. The one or more processors are configured to run a computer program or computer instructions. When the one or more processors execute the computer program or the computer instructions, the communication apparatus performs the channel configuration method according to any one of the first aspect or the possible designs of the first aspect, or performs the channel configuration method according to any one of the fourth aspect or the possible designs of the fourth aspect.

In a possible design, the communication apparatus further includes one or more communication interfaces, the one or more communication interfaces are coupled to the one or more processors, and the one or more communication interfaces are configured to communicate with a module other than the communication apparatus.

In a possible design, the communication apparatus further includes one or more memories, the one or more memories are coupled to the one or more processors, and the one or more memories are configured to store the computer program or the computer instructions. In a possible implementation, the memory is located outside the communication apparatus. In another possible implementation, the memory is located inside the communication apparatus. In this embodiment of this application, the processor and the memory may alternatively be integrated into one component. In other words, the processor and the memory may alternatively be integrated together.

According to an eighth aspect, a communication apparatus is provided. The communication apparatus includes an interface circuit and a logic circuit. The interface circuit is coupled to the logic circuit. The logic circuit is configured to perform the channel configuration method according to any one of the first aspect or the possible designs of the first aspect, or perform the channel configuration method according to any one of the fourth aspect or the possible designs of the fourth aspect. The interface circuit is configured to communicate with a module other than the communication apparatus.

According to a ninth aspect, a computer-readable storage medium is provided. The computer-readable storage medium stores computer instructions or a computer program, and when the computer instructions or the computer program is run on a computer, the computer is enabled to perform the channel configuration method according to any one of the first aspect or the possible designs of the first aspect, or perform the channel configuration method according to any one of the fourth aspect or the possible designs of the fourth aspect.

According to a tenth aspect, a computer program product including computer instructions is provided. When the computer program product runs on a computer, the computer is enabled to perform the channel configuration method according to any one of the first aspect or the possible designs of the first aspect, or perform the channel configuration method according to any one of the fourth aspect or the possible designs of the fourth aspect.

According to an eleventh aspect, an embodiment of this application provides a computer program. When the computer program is run on a computer, the computer is enabled to perform the channel configuration method according to any one of the first aspect or the possible designs of the first aspect, or perform the channel configuration method according to any one of the fourth aspect or the possible designs of the fourth aspect.

For technical effects brought by any design manner of the seventh aspect to the eleventh aspect, refer to the technical effects brought by any one of the possible designs of the first aspect, or refer to the technical effects brought by any one of the possible designs of the fourth aspect. Details are not described again.

BRIEF DESCRIPTION OF THE DRAWINGS

FIG. 1 is a schematic diagram of an architecture of a new short-range protocol sparklink according to an embodiment of this application;

DETAILED DESCRIPTION OF ILLUSTRATIVE EMBODIMENTS

Figures 2A, 2B, 2C:
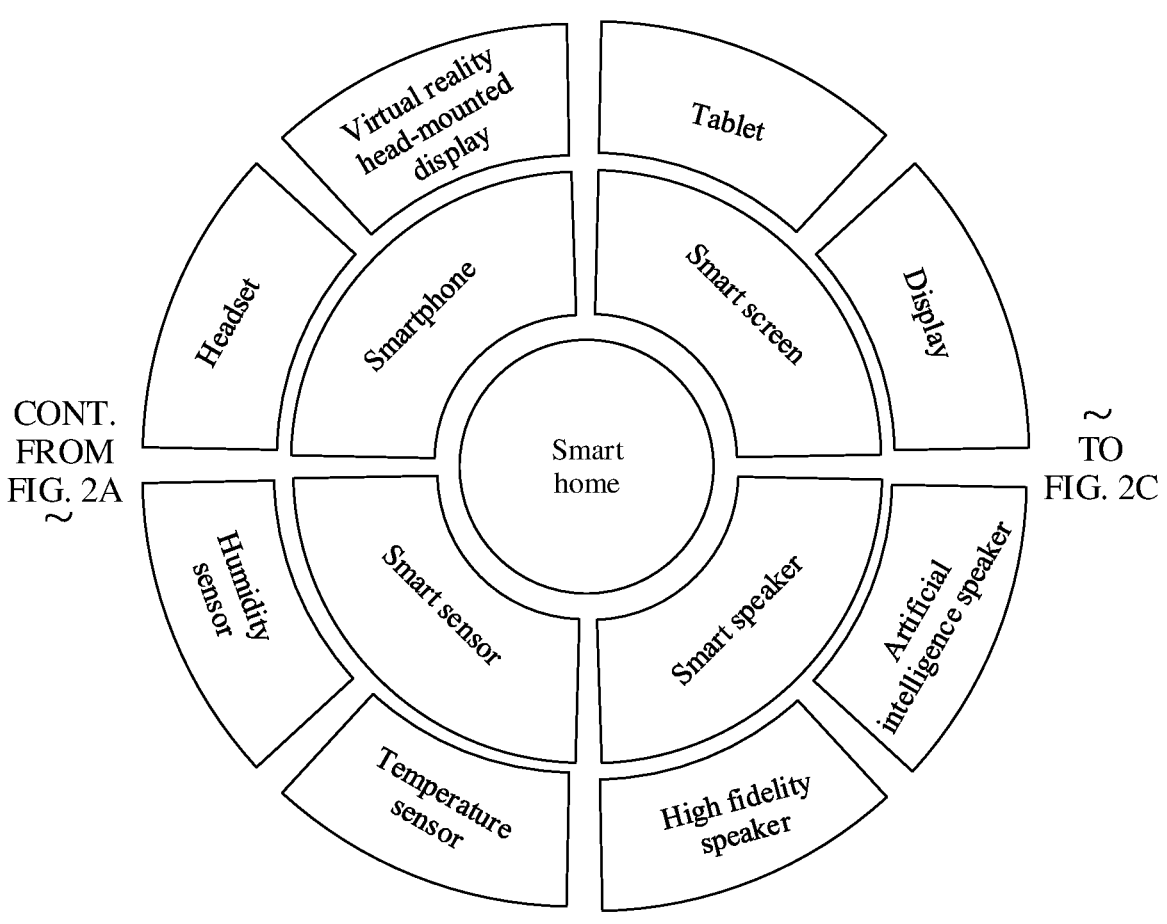
FIG. 2A to FIG. 2D are a schematic diagram of application of a wireless short-range communication scenario according to an embodiment of this application.
Figures 2B, 2C, 2D:
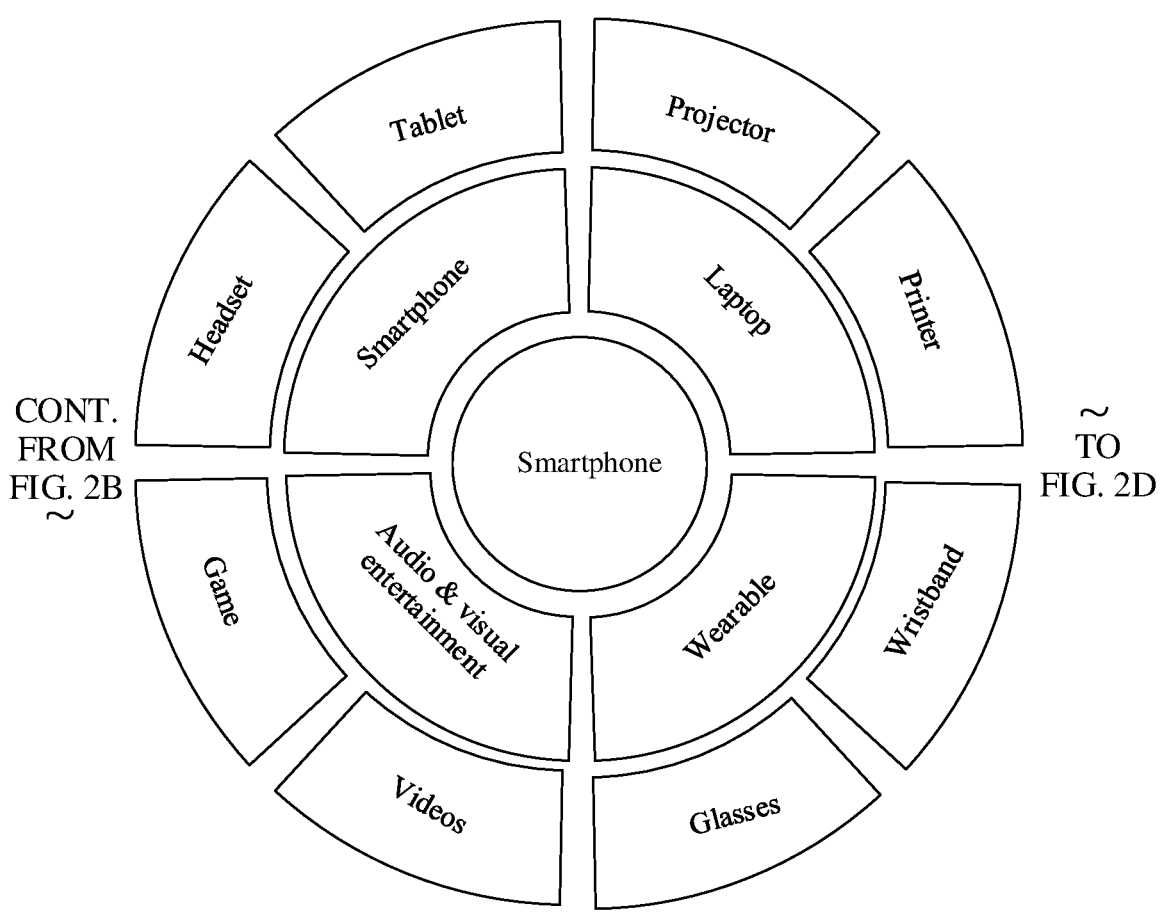
Figures 2C, 2D:
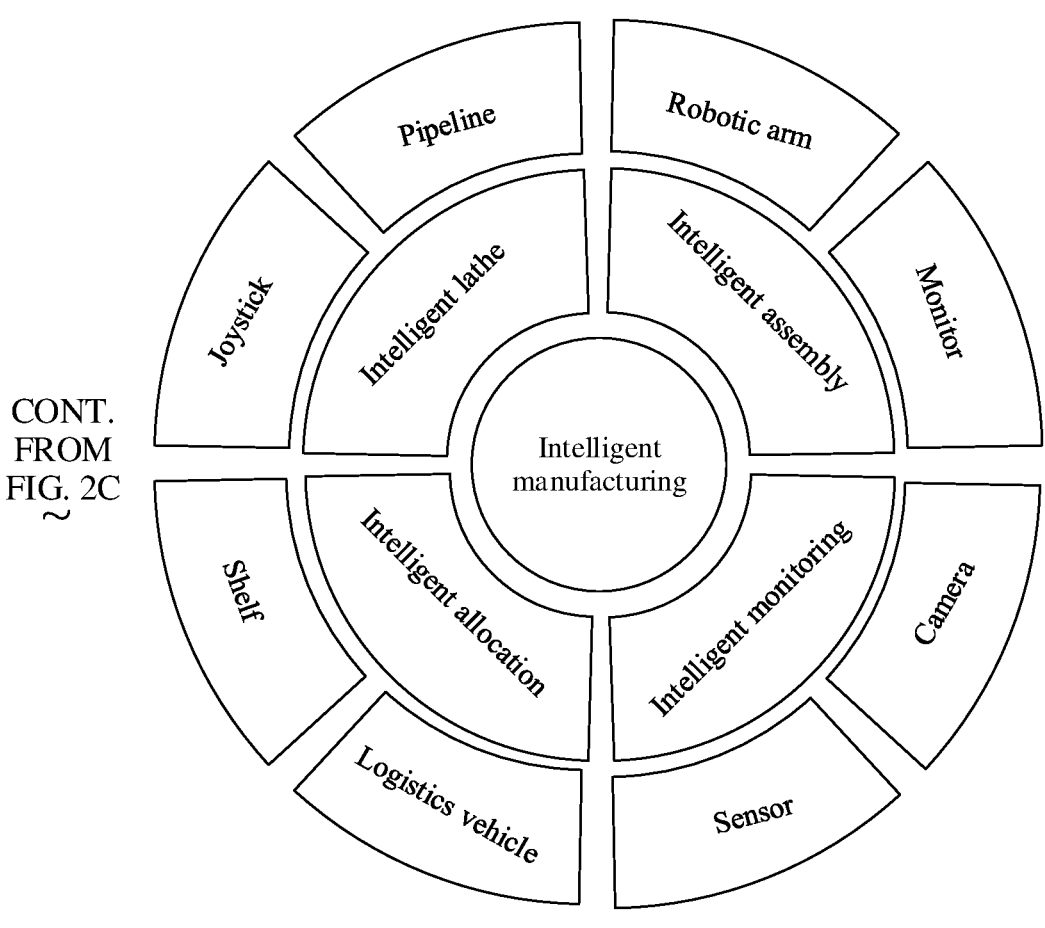

The following describes implementations of embodiments of this application in detail with reference to the accompanying drawings in this specification.

A channel configuration method provided in embodiments of this application may be applied to any communication system. The communication system may include a short-range communication system, a cellular communication system (for example, a long term evolution (long term evolution, LTE) system, or a new radio (new radio access technology, NR) system), a worldwide interoperability for microwave access (WiMAX) communication system, various types of next-generation communication systems (for example, the sixth generation (6G) mobile communication system), or the like. This is not limited. The short-range communication system may be a Bluetooth communication system, a low energy Bluetooth communication system, a wireless fidelity (Wi-Fi) communication system, various types of next-generation short-range communication systems, or the like. This is not limited.

The communication system may include a plurality of communication devices, and the communication devices each may use a new short-range protocol sparklink shown in FIG. 1, to perform communication by using a wireless short-range communication technology, so as to implement sharing of information and wireless transmission of business, and support application in scenarios such as intelligent vehicles, smart homes, smart terminals, and intelligent manufacturing shown in FIG. 2A to FIG. 2D and meet performance requirements of the scenarios.

The communication device may be any device having a sending and receiving function, and includes but is not limited to a cellular phone, a cordless phone, a session initiation protocol (session initiation protocol, SIP) phone, a smartphone (smartphone), a wireless local loop (wireless local loop, WLL) station, a personal digital assistant (personal digital assistant, PDA), a handheld device having a wireless communication function, a computing device, a vehicle-mounted device, a wearable device, an uncrewed aerial vehicle device, a communication device in an internet of things or an internet of vehicles, and another device connected to a wireless modem.

The communication device may alternatively be a communication device in virtual reality (virtual reality, VR), a communication device in augmented reality (AR), a communication device in industrial control (for example, intelligent manufacturing), a communication device in self-driving, a communication device in remote medical, a communication device in a smart grid, a communication device in a smart city, a communication device in a smart home, and the like.

The communication device may alternatively be a personal portable communication device, a computer peripheral device, and various types of household or industrial electrical equipment, including but not limited to a smartphone, a smart screen, a smart speaker (for example, an artificial intelligence (AI) speaker), a high fidelity (HiFi) speaker, a smart sensor, a television wireless headset, a VR head-mounted display, a tablet computer, a display, a camera, a laptop computer, a vehicle-mounted computer, a vehicle-mounted terminal (for example, a microphone and a loudspeaker), a projector, a printer, a smart wristband, a smart watch, smart glasses, an intelligent vehicle, an intelligent lathe, and an intelligent monitoring device.

A specific form of the communication device is not specially limited in embodiments of this application. Types of the communication devices in the communication system may be partially the same, may be the same, or may be completely different. In addition, in embodiments of this application, the communication system may include at least two communication devices, and the at least two communication devices may include a first device and a second device in the following embodiments.

As shown in FIG. 1, an architecture of a new short-range protocol sparklink may include an access layer, a host, and an application (APP). The access layer may simultaneously support a plurality of access technologies. A unified host protocol is used above the access layer. The host may dynamically schedule an access technology supported by the access layer based on a corresponding requirement of the application.

Figure 3A:
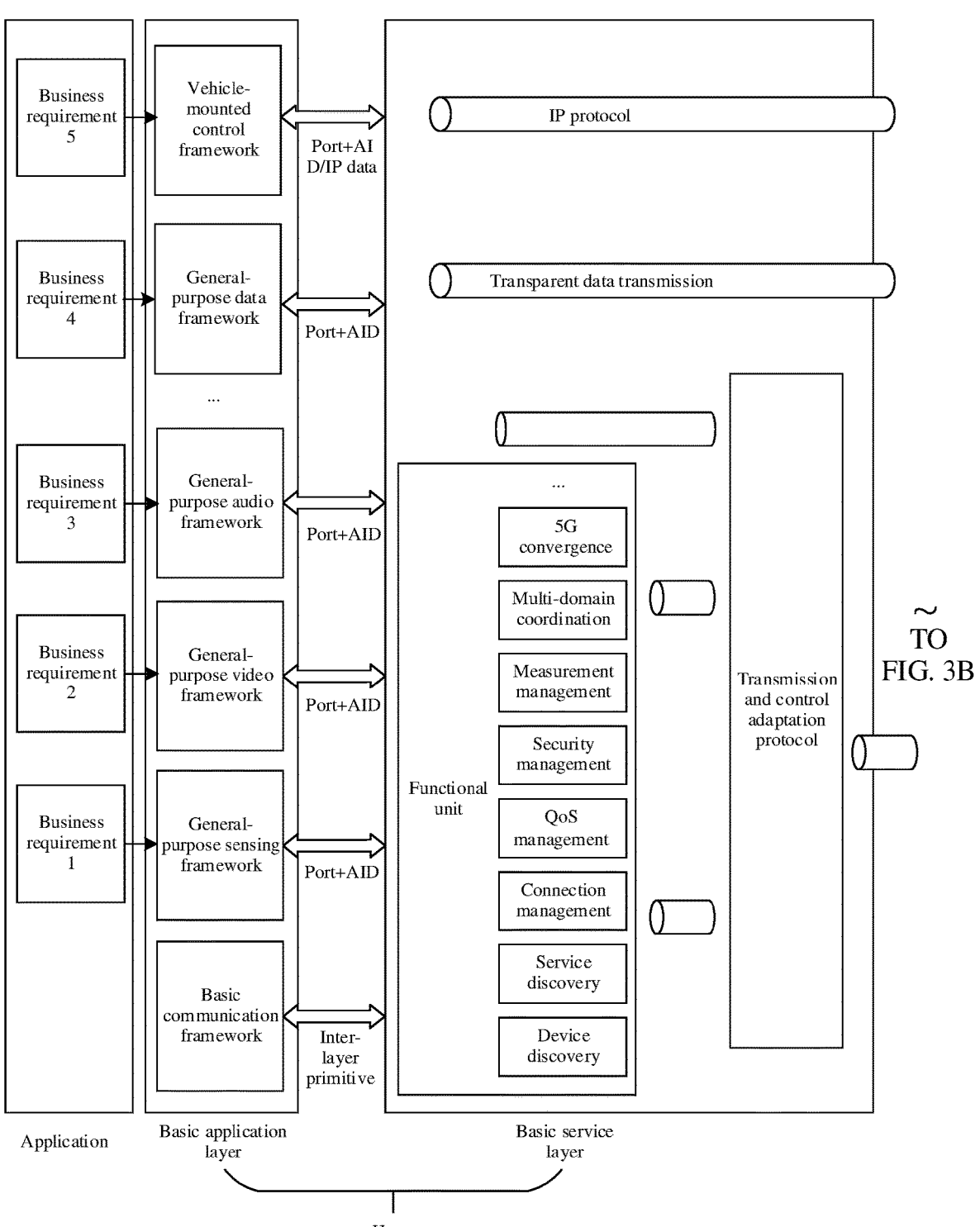
FIG. 3A and FIG. 3B are a schematic diagram of an architecture of a new short-range protocol sparklink according to an embodiment of this application.

Specifically, as shown in FIG. 3A, the host may include a basic application layer and a basic service layer.

As shown in FIG. 3A, the basic application layer may be responsible for undertaking different business requirements (for example, a business requirement 1, a business requirement 2, . . . , and a business requirement 5) of an application at an upper layer, and completes routing of data to the basic service layer based on one or more of an inter-layer primitive, a port (port), an application identifier (application identifier, AID), and an internet protocol (internet protocol, IP) address.

The port may be a channel of the basic application layer. The basic application layer may register a port for business of an application and send data of the business to the basic service layer through the port.

The application identifier may be a mapping identifier of a business function set at an application layer and a quality of service (QoS) flow. Different business function sets may be distinguished based on business identifiers (BIDs). According to different classifications of business, the basic application layer may include a plurality of different business function sets (or described as business modules or business frameworks), and the different business function sets may include classification data processing for business.

For example, as shown in FIG. 3A, the basic application layer may include a basic communication framework, a general-purpose sensing framework, a general-purpose video framework, a general-purpose audio framework, a general-purpose data framework, a vehicle-mounted control framework, and the like. The general-purpose sensing framework may include processing of sensory data. The general-purpose video framework may include processing of a video, for example, encoding and decoding. The general-purpose audio framework may include processing of audio, for example, encoding and decoding. The general-purpose data framework may include processing of file data, for example, encryption and compression. The vehicle-mounted control framework may include processing of vehicle-mounted control data.

As shown in FIG. 3A, the basic service layer may include a plurality of modules or functional units, including but not limited to a device discovery module, a service discovery module, a connection management module, a QoS management module, a security management module, a measurement management module, a multi-domain coordination module, and a fifth generation mobile communication technology (5G) convergence module, to implement functions such as creation, addition, deletion, and release of a transmission channel (TC), and control (for example, selection of an access technology) of a logical channel (LC), and undertake business requirements (for example, traffic, a rate, sound quality, and resolution) of the basic application layer. The basic service layer may be compatible with a plurality of access layer technologies supported by an access layer. For example, the basic service layer may be compatible with the plurality of access technologies such as an SLB access technology and an SLE access technology. In addition, the basic service layer is capable of being compatible with more access technologies in the future.

Specifically, the device discovery module may be configured to discover a device when the device discovery module fails to connect the device. The service discovery module may be configured to discover and operate a service on a device. The connection management module may be configured to manage a transmission channel, including creating, adding, deleting, releasing, and the like. The QoS management module may be configured to manage and negotiate QoS of transmission. The security management module may be responsible for a secure connection of the basic service layer. The measurement management module may be configured to configure measurement and scheduling at a lower layer, to perform power control and the like. In a scenario in which a plurality of domains (subnets) exist, the multi-domain coordination module may implement information exchange between the domains and implements interference avoidance between the domains, to balance a load. The 5G convergence module may be configured to establish a channel with a cellular 5G remote management capability, and implement, by using an authentication and authentication mechanism, a device with a cellular 5G remote control function.

The transmission channel may be a channel of the basic service layer, the logical channel (or described as a logical link) may be a channel of the access layer, and one logical channel corresponds to one access technology. When a communication device needs to send or broadcast data, a basic application layer of the communication device may send the data to a basic service layer through a port, the basic service layer may send the data to an access layer through a transmission channel, and the access layer may send or broadcast the data through a logical channel. When a communication device needs to receive or scan data, an access layer of the communication device may send, through a logical channel, data received or obtained through scanning to a basic service layer, and the basic service layer may send the data to a basic application layer through a transmission channel and a port.

For example, as shown in FIG. 3A, the basic application layer may send, to the basic service layer through the port, non-IP data that carries an AID, or may send, to the basic service layer through the port, IP data that carries IP quintuplets. The basic service layer may send data sent by the basic application layer to the access layer through a transmission channel according to a transmission and control adaptation protocol, send data sent by the basic application layer to the access layer through a transmission channel according to an IP protocol, or send data sent by the basic application layer to the access layer through a transmission channel in a transparent data transmission manner. It may be determined, through ultra path interconnect (UPI), that data transmission is performed according to the transmission and control adaptation protocol, data transmission is performed according to the IP protocol, or data transmission is performed in the transparent data transmission manner.

In addition, transmission at the basic service layer may be classified into control plane transmission and business plane transmission. Correspondingly, a transmission channel at the basic service layer may include a control channel and a business channel. The control channel is for transmitting control plane data, and the business channel is for transmitting business plane data. Establishment of a business channel between communication devices is based on establishment of the control channel. Therefore, a procedure related to the business channel in embodiments of this application is performed based on establishment of the control channel. A procedure for establishing the control channel is not described in embodiments of this application.

The business channel may include a unicast business channel, a multicast business channel, and a broadcast business channel. The unicast business channel is a business channel used to transmit unicast business and can implement peer-to-peer transmission. The multicast business channel is a business channel used to transmit multicast business, and can implement peer-to-group transmission. The multicast business channel has feedback (ack) at a lower layer, and has reliability at the lower layer. The broadcast business channel is a business channel used to transmit broadcast business, and can implement connectionless transmission. The broadcast business channel has no feedback (ack) at a lower layer, and reliability needs to be ensured through a plurality of transmissions. Embodiments of this application mainly describe a procedure related to a broadcast business channel.

It should be noted that one or more ports of the basic application layer may correspond to a same transmission channel of the basic service layer, and one or more transmission channels of the basic service layer may correspond to a same logical channel of the access layer. In addition, a logical channel is a basis for establishing a transmission channel at the basic service layer, and the transmission channel at the basic service layer is available only after the logical channel is successfully established.

Figures 3A, 3B:
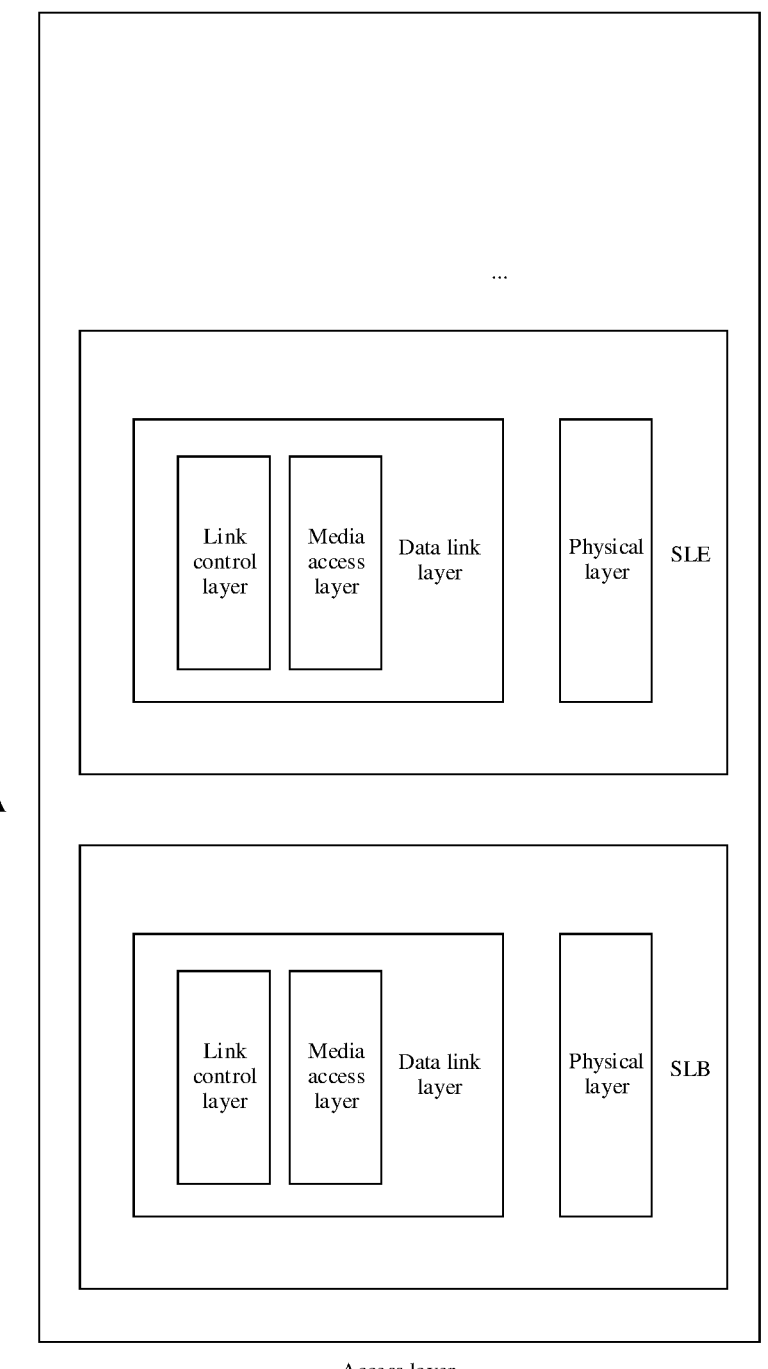

As shown in FIG. 3B, the access layer may be responsible for processing a logical channel at a lower layer, for example, establishing, reconfiguring, or deleting the logical channel, to undertake business requirements (for example, reliable data and real-time data) of the basic service layer. The logical channel may be used to transmit business between two communication devices. The access layer may include a plurality of access technologies, including but not limited to an access technology of a sparklink basic (SLB) short-range wireless communication system, an access technology of a sparklink low energy (SLE) short-range wireless communication system, and another access technology, for example, a Bluetooth low energy (BLE) technology, and another future sparklink alliance access technology. In embodiments of this application, an SLB access technology and an SLE access technology are mainly used as examples to briefly describe an architecture of the access layer.

For example, as shown in FIG. 3B, the access layer may include data link layers and physical layers. The data link layer can implement functions such as resource management, access control, and data segmentation, data cascading, and data reordering, to ensure reliable data transmission. The physical layer may use a transmission medium to provide a physical connection for the data link layer, to implement transparent transmission of a bit stream. In some embodiments, the data link layer may further include a link control layer and a media access layer. The link control layer mainly exchanges a link control protocol (link control protocol, LCP) on a control link based on a link established between nodes, to implement functions such as physical/logical link management and device behavior control. The media access layer is responsible for allocating radio resources and providing a data transmission service for the link control layer. In embodiments of this application, the SLB access technology is mainly responsible for transmission of high-bandwidth, high-rate, and high-power business (for example, video play business), and the SLE access technology is mainly responsible for transmission of low-bandwidth, low-rate, and low-power business (for example, audio play business).

Optionally, for a communication device that supports both access technologies (for example, both the SLB technology and the SLE access technology), an access layer of the communication device can implement SLB access and SLE access via different modules. In embodiments of this application, business at an upper layer may be dynamically transmitted by using a plurality of access technologies, to improve flexibility of transmission of the business.

It may be understood that names of the two access technologies described above are merely examples, and should not be understood as a limitation on embodiments of this application. In another embodiment or in a future architecture, the SLB access technology and the SLE access technology may alternatively use other names.

Based on the foregoing descriptions, a host protocol (or described as a protocol of the upper layer) including the basic application layer and the basic service layer may adapt to the access layer at the lower layer, to meet requirements of different business. Specifically, the host protocol may provide a request for a business function set to initiate business, and be used to transmit and control business data. In addition, in embodiments of this application, each communication device may support at least one access technology, for example, support either of the SLB access technology and the SLE access technology. The upper layer can use the unified host protocol regardless of an access technology supported by the access layer. In other words, the host protocol is compatible with the plurality of access technologies.

Figure 4:
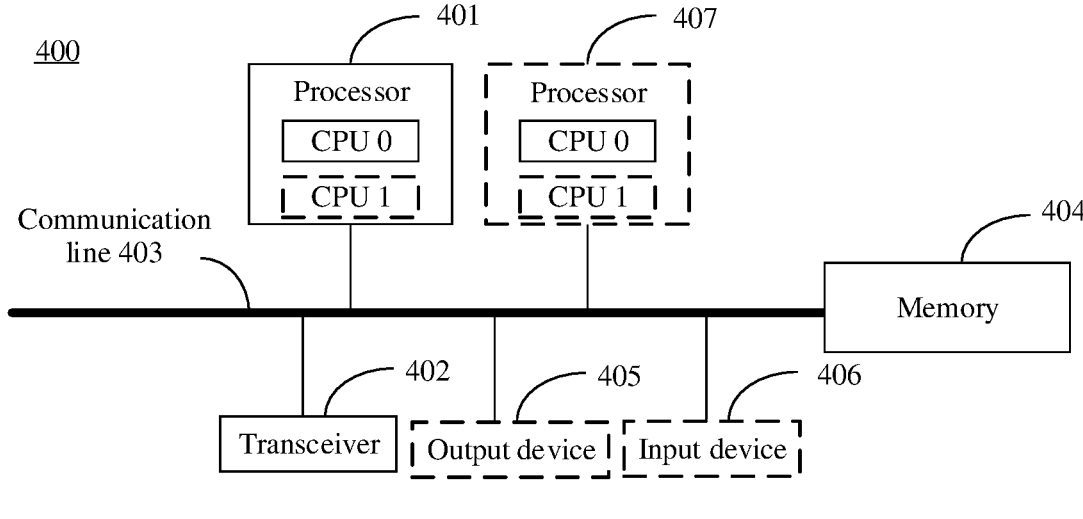
FIG. 4 is a diagram of a composition architecture of a communication apparatus according to an embodiment of this application.

During specific implementation, architectures of layers, for example, a basic application layer, a basic service layer, and an access layer, of a communication device that uses the protocol architecture shown in FIG. 1, or FIG. 3A and FIG. 3B may all use a composition structure shown in FIG. 4, or include components shown in FIG. 4. FIG. 4 is a schematic diagram of composition of a communication apparatus 400 according to an embodiment of this application. The communication apparatus 400 may be a basic application layer or a chip or a system-on-a-chip at the basic application layer, may be a basic service layer or a chip or a system-on-a-chip at the basic service layer, or may be an access layer or a chip or a system-on-a-chip at the access layer. As shown in FIG. 4, the communication apparatus 400 includes a processor 401, a transceiver 402, and a communication line 403.

Further, the communication apparatus 400 may include a memory 404. The processor 401, the memory 404, and the transceiver 402 may be connected through the communication line 403.

The processor 401 is a central processing unit (central processing unit, CPU), a general-purpose processor, a network processor (network processor, NP), a digital signal processor (digital signal processor, DSP), a microprocessor, a microcontroller, a programmable logic device (programmable logic device, PLD), or any combination thereof. The processor 401 may alternatively be another apparatus having a processing function, for example, a circuit, a component, or a software module. This is not limited.

The transceiver 402 is configured to communicate with another device or another communication network. The another communication network may be the Ethernet, a radio access network (radio access network, RAN), a wireless local area network (wireless local area network, WLAN), or the like. The transceiver 402 may be a module, a circuit, a transceiver, or any apparatus that can implement communication.

The communication line 403 is configured to transmit information between the components included in the communication apparatus 400.

The memory 404 is configured to store instructions. The instructions may be a computer program.

The memory 404 may be a read-only memory (read-only memory, ROM) or another type of static storage device that can store static information and/or instructions, may be a random access memory (random access memory, RAM) or another type of dynamic storage device that can store information and/or instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital universal optical disc, a Blu-ray optical disc, or the like), a magnetic disk storage medium or another magnetic storage device, or the like. This is not limited.

It should be noted that the memory 404 may be independent of the processor 401, or may be integrated with the processor 401. The memory 404 may be configured to store instructions, program code, some data, or the like. The memory 404 may be located inside the communication apparatus 400, or may be located outside the communication apparatus 400. This is not limited. The processor 401 is configured to execute the instructions stored in the memory 404, to implement a channel configuration method provided in the following embodiments of this application.

In an example, the processor 401 may include one or more CPUs, for example, a CPU 0 and a CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. For example, the input device 406 is a device such as a keyboard, a mouse, a microphone, or a joystick, and the output device 405 is a device such as a display or a loudspeaker (speaker).

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In embodiments of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Other names may alternatively be used during specific implementation. This is not limited.

With reference to the protocol architecture shown in FIG. 1, or FIG. 3A and FIG. 3B, the following describes the channel configuration method provided in embodiments of this application. A first device may be any communication device that needs to perform broadcasting and that uses the protocol architecture shown in FIG. 1, or FIG. 3A and FIG. 3B in a communication system. The first device may also be referred to as a broadcasting party communication device. A second device may be any communication device that needs to perform scanning and that uses the protocol architecture shown in FIG. 1, or FIG. 3A and FIG. 3B in the communication system. The second device may also be referred to as a scanning party communication device. Layer architectures of the first device and the second device described in the following embodiments may have the components shown in FIG. 4.

Figure 5:
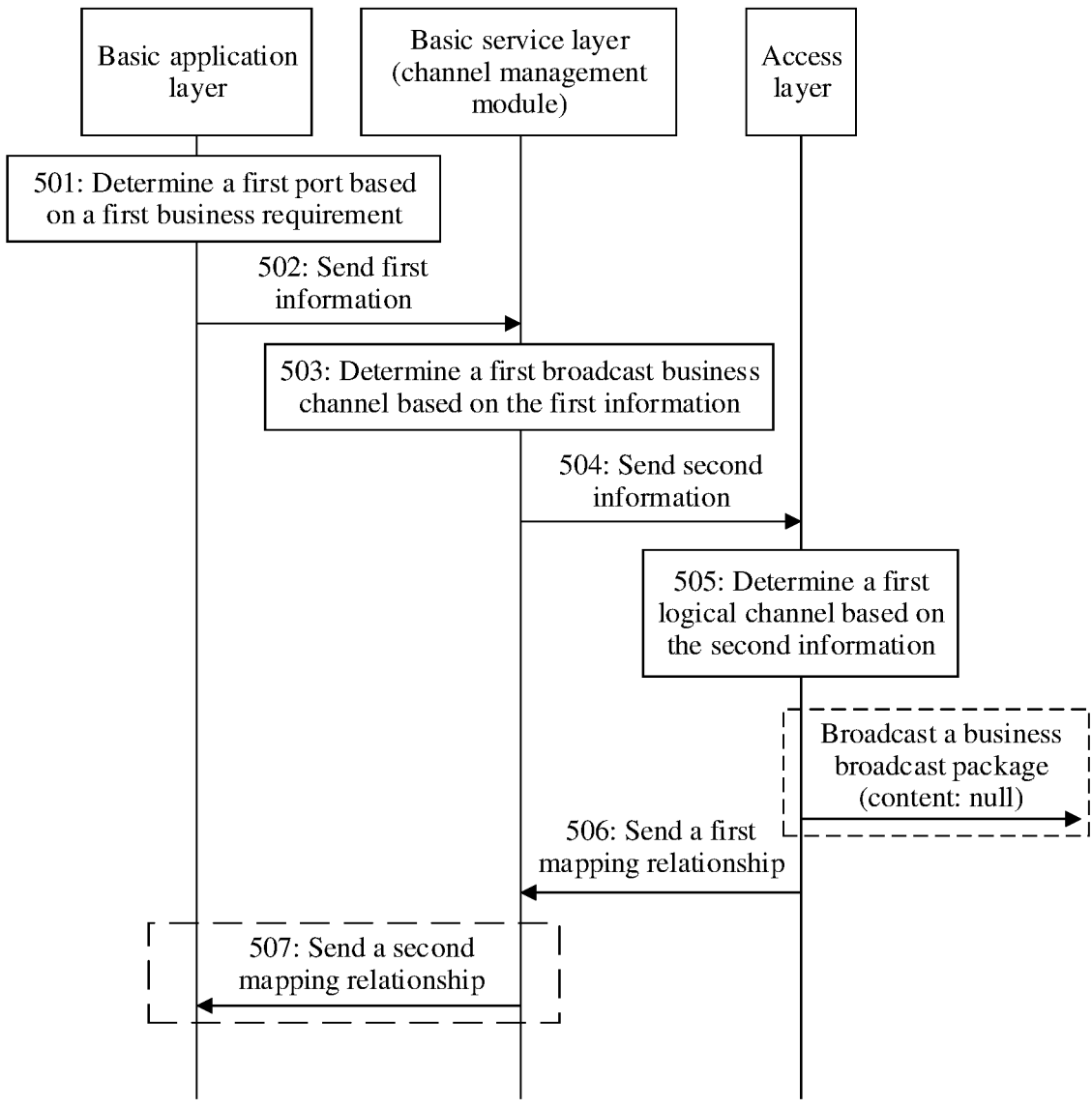
FIG. 5 is a flowchart of a channel configuration method according to an embodiment of this application.

FIG. 5 is a flowchart of a channel configuration method applied to a first device according to an embodiment of this application. As shown in FIG. 5, the method may include the following steps.

Step 501: A basic application layer determines a first port based on a first business requirement.

When the basic application layer needs to perform broadcast business, the basic application layer may determine a port based on a business requirement of the broadcast business, where the business requirement may be considered as an attribute of the port.

That the business requirement is the first business requirement is used as an example. The basic application layer may determine the first port based on the first business requirement.

The first business requirement may include a quality of service identifier (quality of service identifier, QI), and the QI may indicate a requirement of business for a transmission channel, for example, a transmission rate, a delay, a packet loss rate, a communication periodicity, or a maximum packet size.

Optionally, the basic application layer further determines a transmission channel type based on the first business requirement.

The transmission channel type may include a unicast business channel, a multicast business channel, and a broadcast business channel. In this embodiment of this application, when the basic application layer needs to perform broadcast business, the basic application layer may determine that the transmission channel type is the broadcast business channel.

Optionally, the basic application layer further determines first indication information based on the first business requirement.

The first indication information may indicate whether a transmission channel is dedicated to transmission of first business data.

Specifically, when the basic application layer determines, based on the first business requirement, that a transmission channel dedicated to transmission of the first business data needs to be used, the first indication information may indicate that the transmission channel is dedicated to transmission of the first business data, and the basic application layer may send the first indication information to a basic service layer, to indicate the basic service layer to configure a transmission channel dedicated to transmission of the first business data, and transmit the first business data through the configured transmission channel.

When the basic application layer determines, based on the first business requirement, that a transmission channel dedicated to transmission of the first business data does not need to be used, the first indication information may indicate that the transmission channel is not dedicated to transmission of the first business data, and the basic application layer may send the first indication information to the basic service layer, to indicate the basic service layer to configure a transmission channel that can meet the first business requirement, and transmit the first business data through the configured transmission channel.

Step 502: The basic application layer sends first information to the basic service layer. Correspondingly, the basic service layer receives the first information.

The first information may include the first business requirement and identification information of the first port. The first information may be used to request the basic service layer to configure a transmission channel for the first port.

Specifically, the first information may be used to request the basic service layer to configure, for the first port, a transmission channel that can meet the first business requirement.

Optionally, the first information further includes the transmission channel type, to request the basic service layer to configure, for the first port, a transmission channel that meets the transmission channel type.

Optionally, the first information further includes the first indication information, so that the basic service layer determines, based on the first indication information, whether to configure, for the first port, the transmission channel dedicated to transmission of the first business data.

Optionally, the basic application layer sends the first information to a channel management module of the basic service layer, so that the channel management module of the basic service layer configures a transmission channel for the first port based on the first information.

Step 503: The basic service layer determines a first broadcast business channel based on the first information.

The basic service layer may configure a transmission channel for the first port based on the first business requirement in the first information, and the transmission channel may be the first broadcast business channel.

In a first example, the basic service layer may establish the first broadcast business channel based on the first information.

When the basic service layer determines that a related parameter of an existing transmission channel cannot meet the first business requirement, the basic service layer may create a transmission channel that can meet the first business requirement, and determine a created transmission channel as the first broadcast business channel corresponding to the first port.

Optionally, when the first information includes the transmission channel type, the basic service layer may create, based on the transmission channel type, a transmission channel that meets the transmission channel type. In this embodiment of this application, for the broadcast business, the transmission channel type may indicate that a type of the transmission channel is a broadcast business channel. When creating a transmission channel, the basic service layer may create, based on the transmission channel type, the first broadcast business channel whose type is the broadcast business channel.

In a second example, the basic service layer may reuse the first broadcast business channel based on the first information.

When the basic service layer determines that a related parameter of an existing transmission channel can meet the first business requirement, the basic service layer may directly reuse the existing transmission channel, that is, determine the existing transmission channel as the first broadcast business channel corresponding to the first port. Alternatively, the first broadcast business channel may be reused in a reconfiguration manner shown in the following third example. In the second example, an example in which the first broadcast business channel is directly reused is used for description.

Optionally, when the first information includes the transmission channel type, the basic service layer may determine whether a transmission channel that meets the first business requirement and meets the transmission channel type exists in existing transmission channels, and determine the transmission channel as a transmission channel corresponding to the first port if the transmission channel exists. In this embodiment of this application, for the broadcast business, the transmission channel type may indicate that a type of the transmission channel is a broadcast business channel, and the basic service layer may determine whether a broadcast business channel that can meet the first business requirement exists in the existing transmission channels, and determine the broadcast business channel as the first broadcast business channel corresponding to the first port if the broadcast business channel exists.

In a third example, the basic service layer may reconfigure the first broadcast business channel based on the first information.

When the basic service layer determines that a related parameter of an existing transmission channel cannot meet the first business requirement, the basic service layer may reconfigure the related parameter of the existing transmission channel to meet the first business requirement, and determine a reconfigured transmission channel as the first broadcast business channel corresponding to the first port.

Optionally, when the first information includes the transmission channel type, the basic service layer may reconfigure, based on the transmission channel type, a transmission channel corresponding to the transmission channel type. In this embodiment of this application, for the broadcast business, the transmission channel type may indicate that a type of the transmission channel is a broadcast business channel, and the basic service layer may reconfigure a related parameter of an existing broadcast business channel, to obtain the first broadcast business channel.

Based on the foregoing three examples, optionally, the first information further includes the first indication information.

When the first indication information indicates that the transmission channel is dedicated to transmission of the first business data, the basic service layer may create the first broadcast business channel by using the method shown in the first example, so that the first broadcast business channel is dedicated to transmission of the first business data. In addition, the first broadcast business channel is not reused in another subsequent procedure. When the first indication information indicates that the transmission channel is not dedicated to transmission of the first business data, the basic service layer may create the first broadcast business channel by using the method shown in the first example, may reuse the first broadcast business channel by using the method shown in the second example, or reuse the first broadcast business channel in the reconfiguration manner by using the method shown in the third example. This is not limited.

It should be noted that, when the first indication information indicates that the transmission channel is dedicated to transmission of the first business data, the basic service layer may determine, by itself, to determine the first broadcast business channel by using the method shown in the first example, or determine, based on presetting in a preset rule or in a communication protocol, to determine the first broadcast business channel by using the method shown in the first example. This is not limited.

When the first indication information indicates that the transmission channel is not dedicated to transmission of the first business data, or the first information does not include the first indication information, the basic service layer may determine, by itself, to determine the first broadcast business channel by using the first example, the second example, or the third example, or determine, based on presetting in a preset rule or in a communication protocol, to determine the first broadcast business channel by using the first example, the second example, or the third example. This is not limited.

After configuring the first broadcast business channel for the first port, the basic service layer may store a second mapping relationship.

The second mapping relationship may include the identification information of the first port and identification information of the transmission channel corresponding to the first port, that is, the second mapping relationship includes the identification information of the first port and identification information of the first broadcast business channel.

The identification information of the transmission channel may be a transmission channel identifier (transmission channel identifier, TCID), uniquely identifying the transmission channel.

That the identification information of the first port is port1 and the identification information of the first broadcast business channel is TCID1 is used as an example. The second mapping relationship may include port1 and TCID1.

Optionally, the basic service layer determines a first access technology based on the first business requirement.

The basic service layer may determine, based on the first business requirement, the first access technology that can meet the first business requirement from a plurality of access technologies supported by an access layer, so that the access layer performs broadcast business by using the first access technology.

The basic service layer may further determine a logical channel type based on the first business requirement.

The logical channel type may be divided in different manners based on different access technologies.

For example, for an SLE access technology, the logical channel type may include an asynchronous logical channel, a synchronous logical channel, a unidirectional logical channel, and the like.

For example, for an SLB access technology, the logical channel type may include an unacknowledged mode (unacknowledged mode, UM) logical channel, an acknowledged mode (acknowledged mode, AM) logical channel, a transparent mode (transparent mode, TM) logical channel, and the like.

When the AM mode logical channel is used for transmission, header information of a link control layer needs to be added, and the link control layer reports a status. When the UM mode logical channel is used for transmission, header information of a link control layer needs to be added, and the link control layer does not report a status. When the TM mode logical channel is used for transmission, header information of a link control layer is not added, and the link control layer does not report a status. The basic service layer of the first device may select the logical channel type based on the first business requirement and/or the first access technology, and indicate the logical channel type to the access layer.

For example, for business of a payment application, the basic service layer may select a reliable and highly confidential logical channel type. For business of a video application, the channel management module may select a low-delay logical channel type.

It should be noted that, because one logical channel corresponds to one access technology, a process of selecting the logical channel type by the basic service layer herein may also be considered as a process of selecting an access technology by the basic service layer, and the basic application layer does not sense an access technology used by a lower layer. When the basic service layer sends the logical channel type to the access layer, the basic service layer may send, to the access layer, second indication information indicating the first access technology, or may not need to send, to the access layer, second indication information indicating the first access technology. When the basic service layer does not send the second indication information to the access layer, the access layer may determine the first access technology based on the logical channel type.

Alternatively, when the access layer uses different modules to implement different access technologies, the basic service layer may further send the following second information to a module that is in the access layer and that supports the first access technology, so that the access layer transmits the broadcast business via the module that supports the first access technology. In this case, the basic service layer may not need to send, to the access layer, the second indication information indicating the first access technology.

Optionally, the basic service layer further determines third indication information based on the first business requirement.

The third indication information may indicate whether a logical channel is dedicated to transmission of the first business data.

Specifically, when the basic service layer determines, based on the first business requirement, that a logical channel dedicated to transmission of the first business data needs to be used, the third indication information may indicate that the logical channel is dedicated to transmission of the first business data, and the basic service layer may send the third indication information to the access layer, so as to indicate the access layer to configure a logical channel dedicated to transmission of the first business data, and transmit the first business data through a configured logical channel.

When the basic service layer determines, based on the first business requirement, that a logical channel dedicated to transmission of the first business data does not need to be used, the third indication information may indicate that the logical channel is not dedicated to transmission of the first business data, and the basic service layer may send the third indication information to the access layer, so as to indicate the access layer to configure a logical channel that can meet the first business requirement, and transmit the first business data through a configured logical channel.

Optionally, the channel management module of the basic service layer performs the action or function performed by the basic service layer in the foregoing step 503.

Step 504: The basic service layer sends the second information to the access layer. Correspondingly, the access layer receives the second information.

The second information may include the first business requirement, the identification information of the first broadcast business channel, and the logical channel type. The logical channel type indicates a type of the logical channel.

The second information may be used to request to configure, for the first broadcast business channel, a logical channel that meets the first business requirement and the logical channel type.

Specifically, after receiving the first business requirement delivered by the basic application layer, the basic service layer may abstract and process the first business requirement, to generate a first business requirement that can be parsed by the access layer, and deliver, to the access layer, the second information including the first business requirement that can be parsed by the access layer.

Optionally, the second information further includes the second indication information, to request the access layer to configure, for the first broadcast business channel, a logical channel that meets the first access technology.

Optionally, the second information further includes the third indication information, so that the access layer determines, based on the third indication information, whether to configure, for the first broadcast business channel, the logical channel dedicated to transmission of the first business data.

Optionally, the channel management module of the basic service layer sends the second information to the access layer, so that the access layer configures a logical channel for the first broadcast business channel based on the second information.

Step 505: The access layer determines a first logical channel based on the second information.

The access layer may configure, for the first broadcast business channel based on the first business requirement and the logical channel type that are in the second information, the logical channel that meets the first business requirement and the logical channel type. The logical channel may be the first logical channel.

In a first example, the access layer may establish the first logical channel based on the second information.

When the access layer determines that a related parameter of an existing logical channel cannot meet the first business requirement and/or the logical channel type, the access layer may create a logical channel that can meet the first business requirement and the logical channel type, and determine a created logical channel as the first logical channel corresponding to the first broadcast business channel.

Optionally, when the second information includes the second indication information, the access layer may create, based on the second indication information, a first logical channel that meets the first access technology.

In a second example, the access layer may reuse the first logical channel based on the second information.

When the access layer determines that a related parameter of an existing logical channel can meet the first business requirement and the logical channel type, the access layer may directly reuse the existing logical channel, that is, determine the existing logical channel as the first logical channel corresponding to the first broadcast business channel. Alternatively, the first logical channel may be reused in a reconfiguration manner described in the following third example. In the second example, an example in which the first logical channel is directly reused is used for description.

Optionally, when the second information includes the second indication information, the access layer may determine whether a logical channel that meets the first business requirement and meets the logical channel type exists in existing logical channels in the first access technology, and determine the logical channel as the first logical channel corresponding to the first broadcast business channel if the logical channel exists.

In a third example, the access layer may reconfigure the first logical channel based on the second information.

When the access layer determines that a related parameter of an existing logical channel cannot meet the first business requirement and/or the logical channel type, the access layer may reconfigure the related parameter of the existing logical channel to meet the first business requirement and the logical channel type, and determine a reconfigured logical channel as the first logical channel corresponding to the first broadcast business channel.

Optionally, when the second information includes the second indication information, the access layer may reconfigure, based on the second indication information, a logical channel corresponding to the first access technology, to obtain the first logical channel.

Based on the foregoing three examples, optionally, the second information further includes the third indication information.

When the third indication information indicates that the logical channel is dedicated to transmission of the first business data, the access layer may create the first logical channel by using the method shown in the first example, so that the first logical channel is dedicated to transmission of the first business data. In addition, the first logical channel is not reused in another subsequent procedure. When the third indication information indicates that the logical channel is not dedicated to transmission of the first business data, the access layer may create the first logical channel by using the method shown in the first example, may directly reuse the first logical channel by using the method shown in the second example, or reuse the first logical channel in the reconfiguration manner by using the method shown in the third example. This is not limited.

It should be noted that, when the third indication information indicates that the logical channel is dedicated to transmission of the first business data, the access layer may determine, by itself, to determine the first logical channel by using the method shown in the first example, or may determine, based on presetting in a preset rule or in a communication protocol, to determine the first logical channel by using the method shown in the first example. This is not limited.

When the third indication information indicates that the logical channel is not dedicated to transmission of the first business data, or the second information does not include the third indication information, the access layer may determine, by itself, to determine the first logical channel by using the first example, the second example, or the third example, or determine, based on presetting in a preset rule or in a communication protocol, to determine the first logical channel by using the first example, the second example, or the third example. This is not limited.

Optionally, after configuring the first logical channel for the first broadcast business channel, the access layer stores a first mapping relationship.

The first mapping relationship may include the identification information of the first broadcast business channel and identification information of a logical channel corresponding to the first broadcast business channel, that is, the first mapping relationship includes the identification information of the first broadcast business channel and identification information of the first logical channel.

The identification information of the logical channel may be a logical channel identifier (LCID), uniquely identifying the logical channel.

That the identification information of the first broadcast business channel is TCID1 and the identification information of the first logical channel is LCID1 is used as an example. The first mapping relationship may include TCID1 and LCID1.

Optionally, as shown in FIG. 5, after determining the first logical channel, the access layer may periodically broadcast a business broadcast packet on a business channel. In this case, content of the business broadcast packet may be null.

Step 506: The access layer sends the first mapping relationship to the basic service layer. Correspondingly, the basic service layer receives the first mapping relationship.

The first mapping relationship may include the identification information of the first broadcast business channel and the identification information of the first logical channel.

After receiving the first mapping relationship, the basic service layer may determine that the access layer has configured a corresponding logical channel for the first broadcast business channel, and the logical channel is the first logical channel.

Optionally, the access layer sends the first mapping relationship to the channel management module of the basic service layer.

Optionally, the method shown in FIG. 5 further includes the following step 507.

Step 507: The basic service layer sends the second mapping relationship to the basic application layer. Correspondingly, the basic application layer receives the second mapping relationship.

The second mapping relationship may include the identification information of the first port and the identification information of the first broadcast business channel.

After receiving the second mapping relationship, the basic application layer may determine that the basic service layer has configured a corresponding transmission channel for the first port, and the transmission channel is the first broadcast business channel.

Optionally, the channel management module of the basic service layer sends the second mapping relationship to the basic application layer.

Based on the method shown in FIG. 5, the first device may configure channels that are used to transmit the broadcast business and that include the first port, the first broadcast business channel, and the first logical channel, so that the broadcast business is transmitted through configured channels, and one-to-many broadcast business is implemented to meet a business requirement. In addition, the access layer of the first device may support the plurality of access technologies, so that flexibility of transmission of the broadcast business can be improved.

Figure 6:
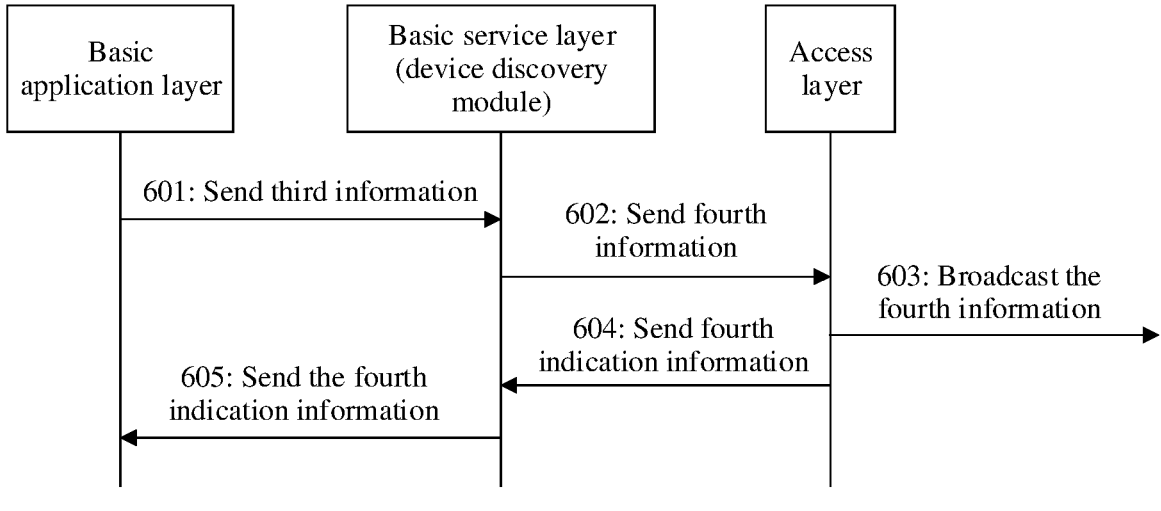
FIG. 6 is a flowchart of a method for broadcasting information about a configured channel according to an embodiment of this application.

Further, after completing channel configuration by using the method shown in FIG. 5, the first device may further broadcast information about the configured channels by using a method shown in FIG. 6.

FIG. 6 shows a method for broadcasting information about a configured channel according to an embodiment of this application. As shown in FIG. 6, the method may be applied to a first device, and the method may include the following steps.

Step 601: A basic application layer sends third information to a basic service layer. Correspondingly, the basic service layer receives the third information.

The third information may include first business information, identification information of a first port, and identification information of a first broadcast business channel.

The first business information may include one or more of the following: a business type, a business name, and a business description.

For example, the business type may be audio business, video business, or call business. This is not limited. Further, the audio business may be further classified into standard audio playing business, lossless audio playing business, and the like, and the video business may be further classified into high-definition video playing business, standard video playing business, and the like.

The business name may be a name of broadcast business, and the business description may be a further description of the business name by the user.

For example, the business description may be a user-defined business name.

The basic application layer may send the third information to the basic service layer through the first port, so that the basic service layer subsequently sends, based on a mapping relationship between the first port and a transmission channel, data from the first port through a transmission channel corresponding to the first port.

The basic application layer delivers the first business information, so that an access layer can broadcast the first business information, and a scanning party communication device that subsequently receives the first business information determines, based on the first business information, whether to configure a channel for business and receive data of the business. If the scanning party communication device determines, based on the first business information, that the data of the business needs to be obtained, the scanning party communication device may configure a corresponding channel for the business, and then receive the data of the business through a configured channel.

Optionally, the basic application layer sends the third information to a device discovery module of the basic service layer.

Step 602: The basic service layer sends fourth information to the access layer. Correspondingly, the access layer receives the fourth information.

The fourth information may include the first business information, the identification information of the first port, the identification information of the first broadcast business channel, and identification information of a first logical channel.

The basic service layer may send the fourth information to the access layer through the first broadcast business channel, so that the access layer subsequently sends, based on a correspondence between the first broadcast business channel and a logical link, data from the first broadcast business channel through a logical link corresponding to the first broadcast business channel.

Optionally, the device discovery module of the basic service layer sends the fourth information to the access layer.

Step 603: The access layer broadcasts the fourth information.

The access layer may transmit the fourth information through the first logical channel, and broadcast, based on a first access technology, the fourth information through a broadcast channel or a fixed time-frequency resource.

The access layer may broadcast a broadcast message including the fourth information. For example, by using an SLE access technology, the access layer broadcasts a broadcast message including the fourth information. As shown in Table 1, the broadcast message may include a broadcast header, broadcast data, and logical channel information. The logical channel information may include identification information of a logical channel. The logical channel information exists after the broadcast data and is independent of the broadcast data. The broadcast header may include indication information indicating whether the logical channel information exists after the broadcast data.

TABLE 1

| Broadcast message | | |
| --- | --- | --- |
| Broadcast header | Broadcast data | Logical channel information |

Optionally, the access layer may alternatively periodically broadcast a business broadcast packet through a business channel. In this case, content of the business broadcast packet is null (null). The business broadcast packet with null content may alternatively be described as a data packet periodically sent before first business data is sent.

Step 604: The access layer sends fourth indication information to the basic service layer. Correspondingly, the basic service layer receives the fourth indication information.

The fourth indication information may indicate that the access layer has completed broadcasting of the fourth information.

The access layer may send the fourth indication information to the basic service layer through the first logical channel.

Optionally, the access layer sends the fourth indication information to the device discovery module of the basic service layer.

Step 605: The basic service layer sends the fourth indication information to the basic application layer. Correspondingly, the basic application layer receives the fourth indication information.

The basic service layer may transmit the fourth indication information through the first broadcast business channel, and send the fourth indication information to the basic application layer through the first port.

Optionally, the device discovery module of the basic service layer sends the fourth indication information to the basic application layer.

Based on the method shown in FIG. 6, the basic service layer of the first device may send, based on the third information sent by the basic application layer, the fourth information that includes the business information and information about the configured channel to the access layer, so that the access layer broadcasts the fourth information. After broadcasting the fourth information, the access layer may further send the fourth indication information to the basic service layer, to indicate that broadcasting of the fourth information has been completed. The basic service layer then reports the fourth indication information to the basic application layer, and the basic application layer obtains the fourth indication information. Thus, channel configuration is completed. Further, the basic application layer may broadcast, based on the configured channel, the first business data sequentially through the basic application layer, the basic service layer, and the access layer by using step 606 and step 607 shown in FIG. 7, to complete transmission of the broadcast business.

Figure 7:
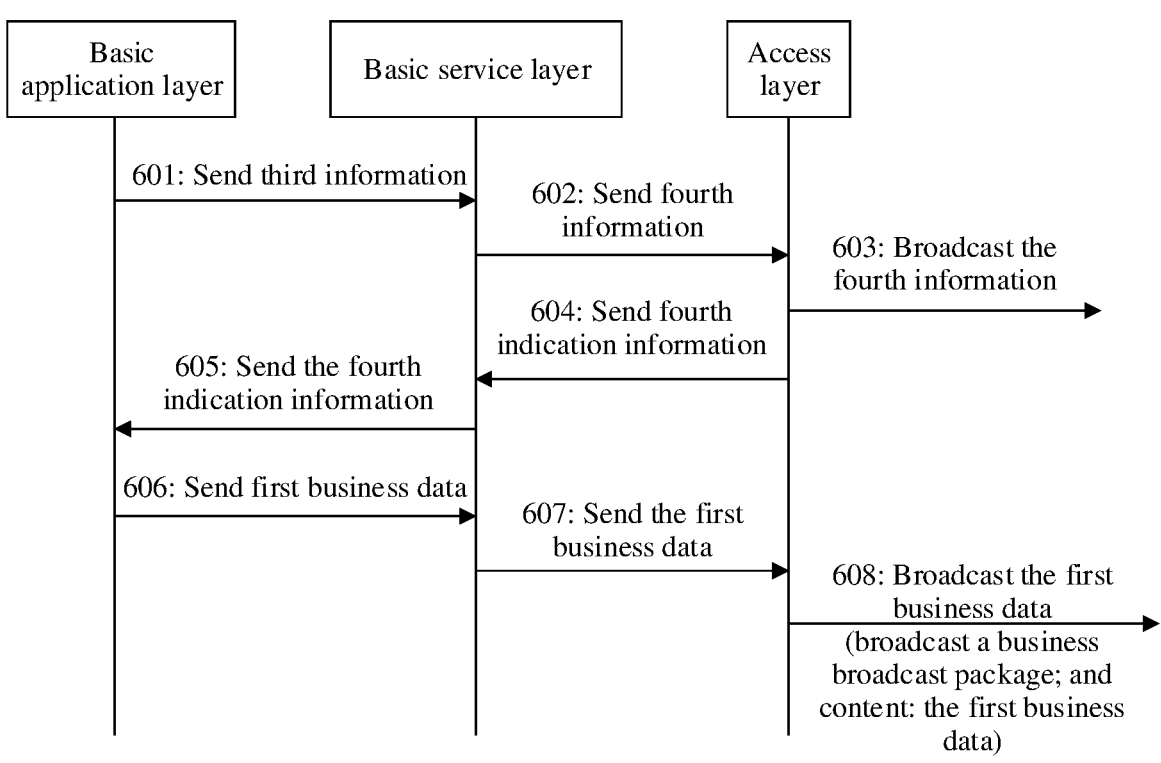
FIG. 7 is a flowchart of a business data transmission method according to an embodiment of this application.

FIG. 7 shows a business data transmission method according to an embodiment of this application. As shown in FIG. 7, the transmission method may be applied to the first device, and the transmission method may include the foregoing step 6o*i* to step 605 and the following step 606 to step 608.

Step 606: The basic application layer sends the first business data to the basic service layer.

The basic application layer may send the first business data to the basic service layer through the first port.

Step 607: The basic service layer sends the first business data to the access layer.

The basic service layer may send the first business data to the access layer through the first broadcast business channel.

Step 608: The access layer broadcasts the first business data.

The access layer may transmit the first business data through the first logical channel, and broadcast the first business data through the business channel.

Optionally, the access layer broadcasts, through the business channel, a business broadcast packet including the first business data.

Specifically, the access layer may broadcast the first business data by using the first access technology.

In a first example, that the first access technology is the SLE access technology is used as an example. The SLE access technology is an access technology that can implement fast discovery and connection and has a low power consumption advantage. According to the SLE access technology, in an unconnected state, a broadcasting party communication device (for example, the first device) may usually select one or more broadcast channels from three fixed broadcast channels to send a broadcast message sequentially, and the scanning party communication device (for example, a second device) may scan a received broadcast message on the broadcast channel on which the broadcasting party communication device sends the broadcast message, so as to discover the broadcasting party communication device. In addition, the SLE access technology may support the scanning party communication device in continuing to send a scan request to the broadcasting party communication device after the broadcast message is received, to require the broadcasting party communication device to send more device information.

Figure 8:
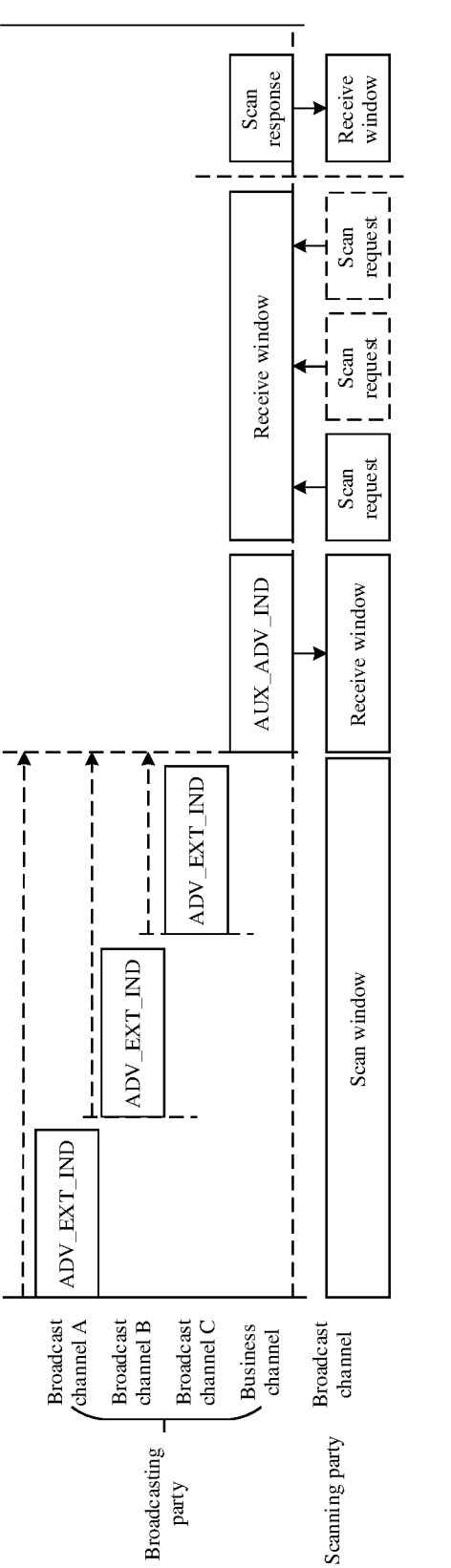
FIG. 8 is a schematic diagram of an SLE access technology according to an embodiment of this application.

For example, as shown in FIG. 8, according to the SLE access technology, in an unconnected state, a broadcasting party communication device may send a broadcast message (namely, ADV_EXT_IND) on a broadcast channel A, a broadcast channel B, and a broadcast channel C. ADV_EXT_IND is a basic broadcast type of the SLE access technology, and a host protocol of the broadcasting party communication device may configure the access layer to send, based on the SLE access technology, basic broadcast on the foregoing three broadcast channels. ADV_EXT_IND may also carry time-frequency pointer information that is used to point to a broadcast packet (namely, AUX_ADV_IND) carried on the business channel. A scanning party communication device may select a broadcast channel in a scan window for scanning. After receiving a broadcast message, the scanning party communication device may continue to receive the broadcast packet on the business channel based on the time-frequency pointer information, and send a scan request (scan request), to request the broadcasting party communication device to continue to send more device information. The broadcasting party communication device may receive the scan request based on a receive window. A maximum length of the receive window may be a length of 15 scan requests, and the length may be reconfigured. After receiving the scan request, the broadcasting party communication device may return a scan response (scan response) to the scanning party communication device.

Based on the methods shown in FIG. 6 and FIG. 7, and with reference to the SLE access technology shown in FIG. 8, when broadcasting the fourth information based on the foregoing step 603, the access layer of the first device may broadcast, through the broadcast channel, the broadcast message including the fourth information. The broadcast message may further carry first time-frequency pointer information, and the first time-frequency pointer information may indicate a time-frequency resource for the broadcast packet. The access layer of the first device may further send a broadcast packet through a business channel on the time-frequency resource indicated by the first time-frequency pointer information. The broadcast packet may carry second time-frequency pointer information, and the second time-frequency pointer information may indicate a time-frequency resource for the first business data. When broadcasting the first business data based on the foregoing step 608, the access layer of the first device may broadcast, through the business channel, a business broadcast packet including the first business data on the time-frequency resource indicated by the second time-frequency pointer information.

It should be noted that, in the SLE access technology, before the broadcasting party communication device establishes a connection to the scanning party communication device, the broadcasting party communication device may send a broadcast message. The broadcast message may include indication information indicating that the broadcasting party communication device expects to become a resource scheduling (grant, G) device, or include indication information indicating that the broadcasting party communication device expects to become a terminal (terminal, T) device. After obtaining the broadcast message through scanning, the scanning party communication device may send a connection request to the broadcasting party communication device. The connection request may include indication information indicating that the scanning party communication device expects to become a G device, or include indication information indicating that the scanning party communication device expects to become a T device. After receiving the connection request, the broadcasting party communication device negotiates with the scanning party communication device based on the connection request, to determine that the broadcasting party communication device becomes a T device and the scanning party communication device becomes a G device, so as to establish the connection. Alternatively, it is determined through negotiation that the broadcasting party communication device becomes a G device, and the scanning party communication device becomes a T device, so as to establish the connection. Alternatively, the negotiation fails, and the connection fails. When the broadcasting party communication device successfully establishes the connection to the scanning party communication device, the device that becomes the G device may serve as a resource scheduling device for resource scheduling.

That a broadcast message sent by the broadcasting party communication device includes indication information indicating that the broadcasting party communication device expects to become a T device is used as an example. After obtaining the broadcast message through scanning, the scanning party communication device may send a connection request to the broadcasting party communication device. It is assumed that the connection request includes indication information indicating that the scanning party communication device expects to become a G device, the broadcasting party communication device may determine, based on the connection request, that the broadcasting party communication device is a T device and the scanning party communication device is the G device, and successfully establish a connection to the scanning party communication device. The scanning party communication device serves as a resource scheduling device for resource scheduling. It is assumed that the connection request includes indication information indicating that the scanning party communication device expects to become a T device, because both the broadcasting party communication device and the scanning party communication device expect to become the T device, the broadcasting party communication device may determine, based on the connection request, that the broadcasting party communication device is a G device and the scanning party communication device becomes the T device, and successfully establish a connection to the scanning party communication device. The broadcasting party communication device serves as a resource scheduling device for resource scheduling. The broadcasting party communication device may alternatively refuse to become the G device, that is, the broadcasting party communication device refuses to establish the connection to the scanning party communication device.

That a broadcast message sent by the broadcasting party communication device includes indication information indicating that the broadcasting party communication device expects to become a G device is used as another example. After obtaining the broadcast message through scanning, the scanning party communication device may send a connection request to the broadcasting party communication device. It is assumed that the connection request includes indication information indicating that the scanning party communication device expects to become a T device, the broadcasting party communication device may determine, based on the connection request, that the broadcasting party communication device is a G device and the scanning party communication device is the T device, and successfully establish a connection to the scanning party communication device. The broadcasting party communication device serves as a resource scheduling device for resource scheduling. It is assumed that the connection request includes indication information indicating that the scanning party communication device expects to become a G device, because both the broadcasting party communication device and the scanning party communication device expect to become the G device, the broadcasting party communication device may determine, based on the connection request, that the broadcasting party communication device is a T device and the scanning party communication device becomes the G device, and successfully establish a connection to the scanning party communication device. The scanning party communication device serves as a resource scheduling device for resource scheduling. The broadcasting party communication device may alternatively refuse to become the T device, that is, the broadcasting party communication device refuses to establish the connection to the scanning party communication device.

In a second example, that the access technology is an SLB access technology is used as an example. The SLB access technology is an access technology having a large bandwidth capability. In the SLB access technology, devices can be classified into a G device and a T device. The G device may be a resource scheduling center. In the SLB access technology, the G device generally sends a broadcast message, the T device scans and receives the broadcast message from the G device, and the G device does not scan and discover the T device. In other words, in the SLB access technology, before connection, a device discovery process is unidirectional, and only the T device can discover the G device.

Figure 9:
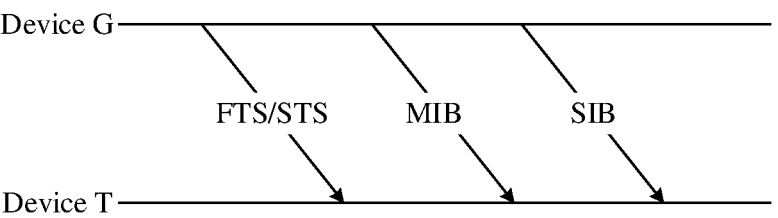
FIG. 9 is a schematic diagram of an SLB access technology according to an embodiment of this application.

For example, as shown in FIG. 9, a G device may periodically send a first synchronization signal (first sync signal, FTS), a second synchronization signal (second sync signal, STS), a master information block (master information block, MIB) message, and a system information block (system information block, SIB) message on a fixed time-frequency domain resource. After receiving and synchronizing FI'S and STS, a T device completes downlink synchronization, synchronously receives the MIB message, and then receives the SIB message, to complete a synchronization procedure between the G device and the T device.

Based on the methods shown in FIG. 6 and FIG. 7, and with reference to the SLB access technology shown in FIG. 9, when broadcasting the fourth information based on the foregoing step 603, the access layer of the first device may broadcast, through the broadcast channel, the SIB message including the fourth information. The SIB message may further include search space. The search space may indicate a time-frequency resource on which downlink dynamic scheduling information may be located. The downlink dynamic scheduling information may be used to schedule downlink data (for example, the first business data). A scanning party communication device (for example, a second device) may blindly detect the downlink dynamic scheduling information through the search space to obtain a physical resource on which downlink data of the scanning party communication device is located, and then parse the downlink data on the corresponding physical resource. When broadcasting the first business data based on the foregoing step 608, the access layer of the first device may broadcast a business broadcast packet including the first business data on the physical resource indicated by the downlink dynamic scheduling information, so that the scanning party communication device can obtain the first business data on the corresponding physical resource.

Based on the methods shown in FIG. 5 to FIG. 9, the first device may configure a channel by using the method shown in FIG. 5, and transmit business data based on a configured channel by using the methods shown in FIG. 6 to FIG. 9. The methods shown in FIG. 5 to FIG. 9 may be applied to a communication scenario in which when the first device performs broadcast business in a broadcast manner, the first device does not need to care about who is the scanning party communication device, and does not need to know whether the scanning party communication device can completely receive data broadcast by the first device. For example, the communication scenario may be broadcasting of audio data such as flight information, music, and advertisements in an airport.

Figure 10:
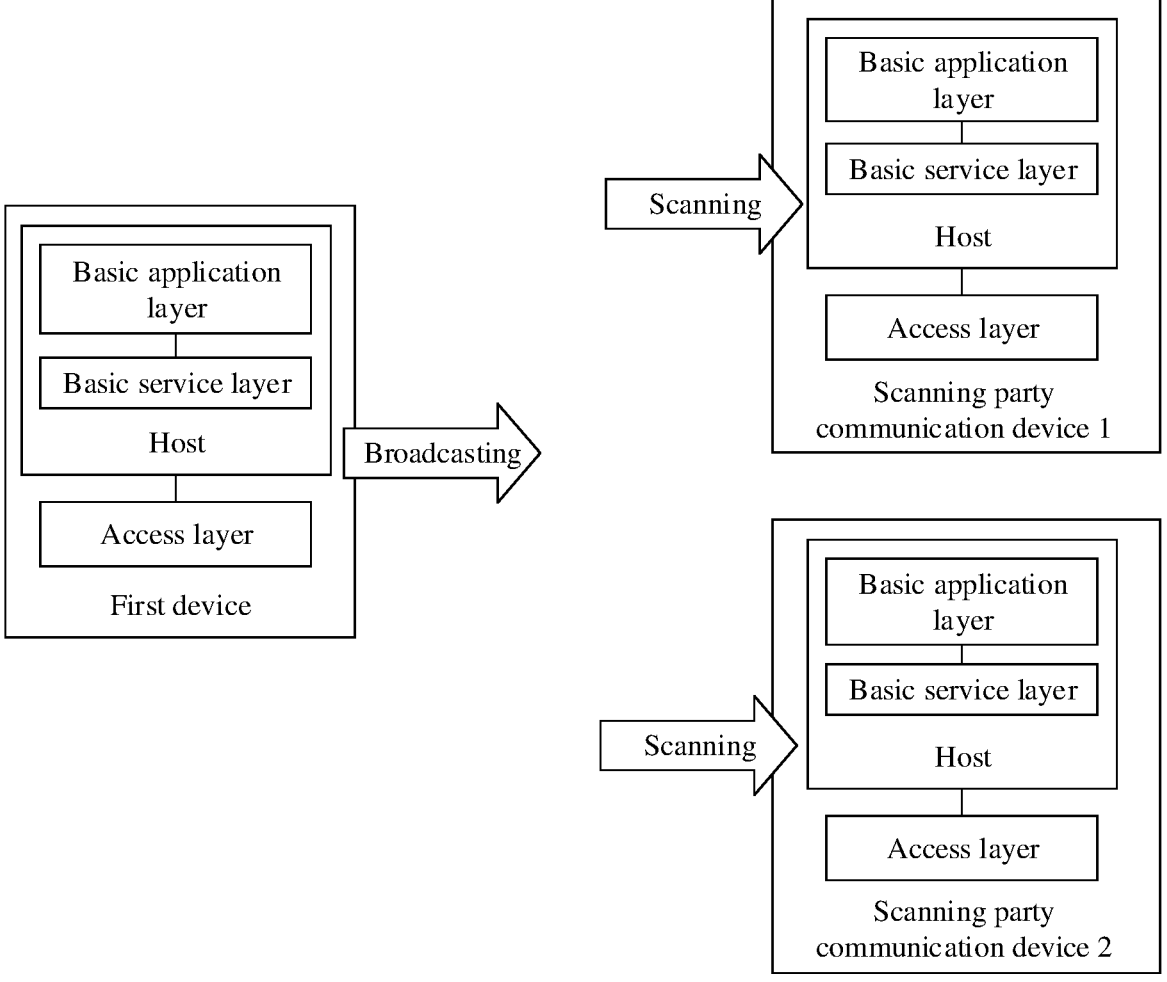
FIG. 10 is a schematic diagram of a business data transmission method according to an embodiment of this application.

In embodiments of this application, the channel configured by the first device may be used to transmit the broadcast business, and overall business is not completed based on establishment of the connection between the broadcasting party communication device and the scanning party communication device. As shown in FIG. 10, a first device may perform one-to-many broadcast business transmission based on a configured channel, that is, the first device may broadcast business data based on the configured channel, does not need to care about who is a scanning party communication device, and does not need to know whether the scanning party communication device can completely receive the business data broadcast by the first device.

Figure 11:
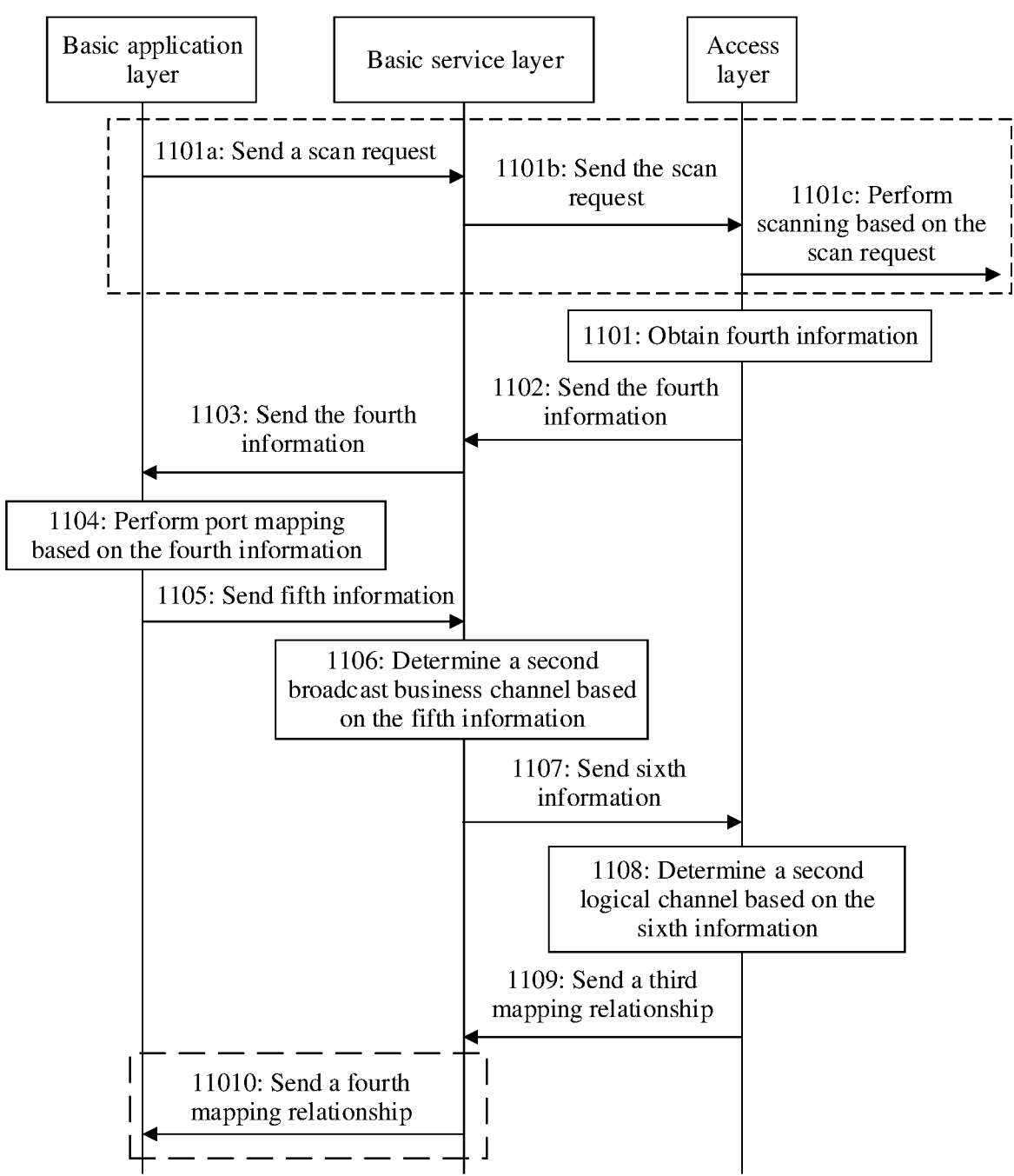
FIG. 11 is a flowchart of a channel configuration method according to an embodiment of this application.
Figures 12, 13:
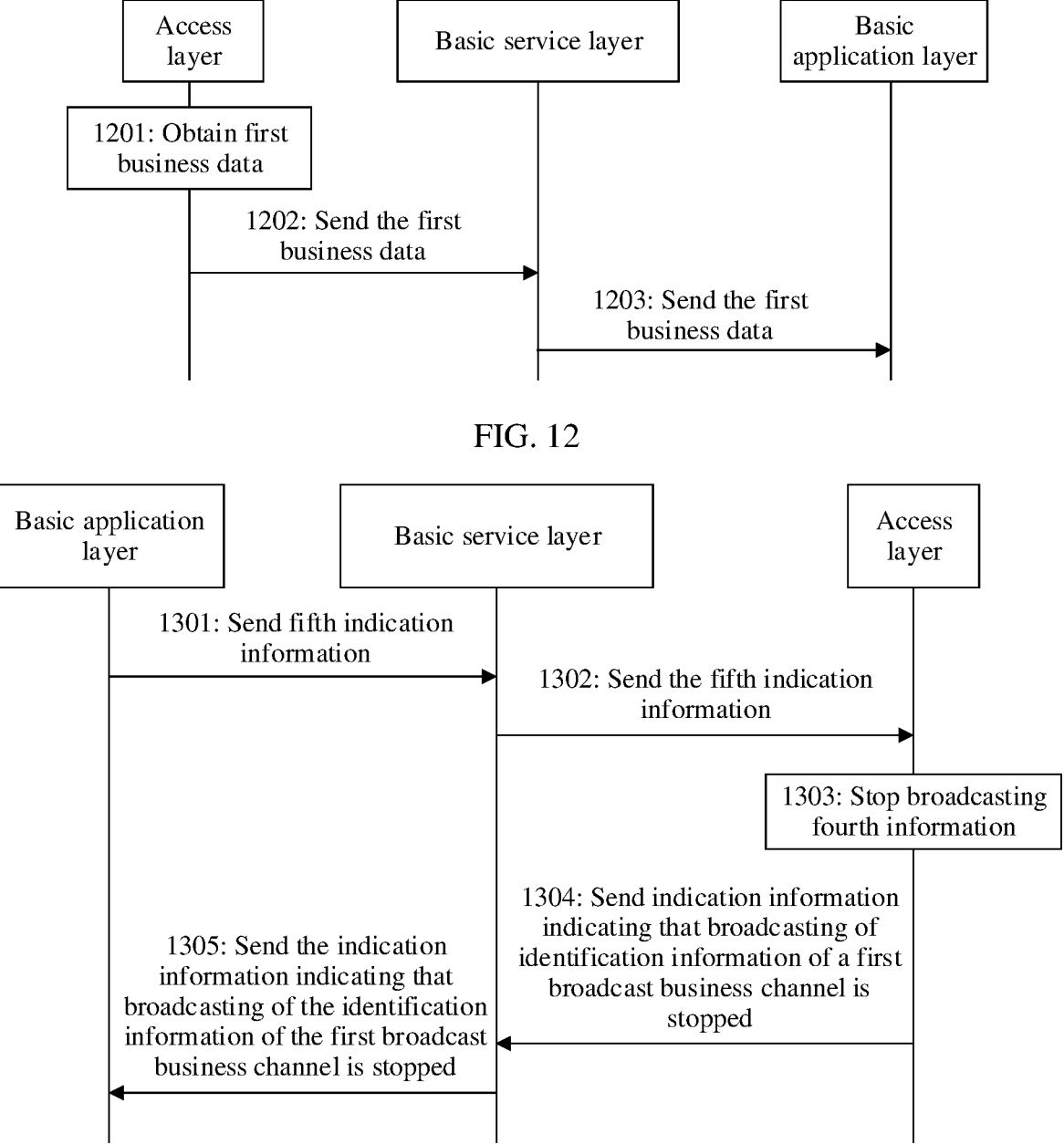
FIG. 12 is a flowchart of a business data transmission method according to an embodiment of this application.
FIG. 13 is a flowchart of a broadcast stop method according to an embodiment of this application.

Corresponding to that, based on the methods shown in FIG. 5 to FIG. 10, the first device configures the channel and broadcasts the first business data, that a scanning party communication device is a second device is used as an example, and the second device may configure a channel by using a method shown in FIG. 11, and receive first business data by using a method shown in FIG. 12.

FIG. 11 shows a channel configuration method according to an embodiment of this application. As shown in FIG. 11, the method may be applied to a second device, and the method may include the following steps.

Step 1101: An access layer obtains fourth information.

The fourth information may include first business information, identification information of a first port, identification information of a first broadcast business channel, and identification information of a first logical channel.

Specifically, the second device may obtain the fourth information by performing the following step 1101*a* to step 1101*c*.

Step 1101*a*: A basic application layer sends a scan request to a basic service layer. Correspondingly, the basic service layer receives the scan request.

When the basic application layer needs to receive broadcast business, the basic application layer may send the scan request to the basic service layer, so as to configure the access layer through the basic service layer to perform a scanning procedure.

Optionally, the basic application layer further determines a port for the broadcast business based on a business requirement of the broadcast business.

That the business requirement is a first business requirement is used as an example. The basic application layer may determine a second port based on the first business requirement.

Optionally, the basic application layer sends the scan request to a device discovery module of the basic service layer.

Step 1101*b*: The basic service layer sends the scan request to the access layer. Correspondingly, the access layer receives the scan request.

The basic service layer may convert the scan request into a scan request that can be parsed by the access layer, so that the access layer performs a scanning procedure based on the scan request.

Optionally, when the access layer receives a plurality of scan requests sent by the basic service layer, the access layer may arbitrate and merge the plurality of scan requests, to reduce a quantity of times that the second device performs the scanning procedure, and reduce power consumption of the second device. Particularly, reducing the quantity of times that the access layer in the second device performs the foregoing scanning procedure is alternatively described as reducing overlapping commands executed by the access layer, to reduce the power consumption of the second device.

Optionally, the scan request may include a business type, so as to filter, based on the business type, a broadcast message obtained through scanning by the access layer.

Optionally, the device sending module of the basic service layer sends the scan request to the access layer.

Step 1101*c*: The access layer performs scanning based on the scan request.

The access layer may perform a scanning procedure based on the scan request, to obtain the broadcast message.

In this embodiment of this application, an access layer of a first device may broadcast the fourth information through a broadcast channel, and the access layer of the second device may obtain the fourth information through scanning when performing the scanning procedure.

Step 1102: The access layer sends fourth information to the basic service layer. Correspondingly, the basic service layer receives the fourth information.

After obtaining the broadcast message (for example, the fourth information) through scanning, the access layer may directly send the broadcast message obtained through scanning to the basic service layer. If the access layer has a filtering function, the access layer may filter the broadcast message obtained through scanning and send a broadcast message obtained through filtering to the basic service layer.

In this embodiment of this application, the access layer may directly send the fourth information obtained through scanning to the basic service layer, or may parse the fourth information, determine, based on the business type in the scan request and the first business information in the fourth information, whether the business type matches the first business information, and send the fourth information to the basic service layer if the business type matches the first business information or discard the fourth information if the business type fails to match the first business information.

Optionally, the access layer sends the fourth information to the device discovery module of the basic service layer.

Step 1103: The basic service layer sends the fourth information to the basic application layer. Correspondingly, the basic application layer receives the fourth information.

The basic service layer may filter, based on the business type in the scan request, the broadcast message obtained through scanning by the access layer, and send the filtered broadcast message to the basic application layer.

In this embodiment of this application, the basic service layer may parse the fourth information, determine, based on the business type in the scan request and the first business information in the fourth information, whether the business type matches the first business information, and send the fourth information to the basic application layer if the business type matches the first business information or discard the fourth information if the business type fails to match the first business information.

Optionally, the device discovery module of the basic service layer sends the fourth information to the basic application layer.

Step 1104: The basic application layer performs port mapping based on the fourth information.

After receiving the fourth information, the basic application layer may parse the fourth information to obtain the first port, and map the second port to the first port, so that the basic application layer of the second device receives, through the second port, first business data sent by a basic application layer of the first device through the first port.

Optionally, the basic application layer further determines a transmission channel type based on the first business requirement.

The transmission channel type may include a unicast business channel, a multicast business channel, and a broadcast business channel. In this embodiment of this application, when the basic application layer needs to perform broadcast business, the basic application layer may determine that the transmission channel type is the broadcast business channel.

Optionally, the basic application layer further determines first indication information based on the first business requirement.

The first indication information may indicate whether a transmission channel is dedicated to transmission of the first business data.

It should be noted that, for descriptions of determining the transmission channel type and/or the first indication information by the basic application layer of the second device based on the first business requirement, refer to the related descriptions of determining the transmission channel type and/or the first indication information by the basic application layer of the first device based on the first business requirement in the foregoing step 501. Details are not described again.

Step 1105: The basic application layer sends fifth information to the basic service layer. Correspondingly, the basic service layer receives the fifth information.

The fifth information may include the first business requirement, identification information of the second port, the identification information of the first broadcast business channel, and the identification information of the first logical channel.

The fifth information may be used to request the basic service layer to configure a transmission channel for the second port.

Specifically, the fifth information may be used to request the basic service layer to configure, for the second port, a transmission channel that can meet the first business requirement.

Optionally, the fifth information further includes the transmission channel type, to request the basic service layer to configure, for a second port, a transmission channel that meets the transmission channel type.

Optionally, the fifth information further includes the first indication information, so that the basic service layer determines, based on the first indication information, whether to configure, for the second port, the transmission channel dedicated to transmission of the first business data.

Optionally, the basic application layer sends the fifth information to a channel management module of the basic service layer, so that the channel management module of the basic service layer configures a transmission channel for the second port based on the fifth information.

Step 1106: The basic service layer determines a second broadcast business channel based on the fifth information.

The basic service layer may configure a transmission channel for the second port based on the first business requirement in the fifth information, and the transmission channel may be the second broadcast business channel.

Specifically, the basic service layer may create, reconfigure, or reuse the second broadcast business channel based on the fifth information. For descriptions of determining the second broadcast business channel by the basic service layer of the second device based on the fifth information, refer to the related descriptions of determining the first broadcast business channel by the basic service layer of the first device based on the first information in the foregoing step 502. Details are not described again.

After configuring the second broadcast business channel for the second port, the basic service layer may store a fourth mapping relationship.

The fourth mapping relationship may include the identification information of the second port and identification information of a transmission channel corresponding to the second port, that is, the fourth mapping relationship includes the identification information of the second port and identification information of the second broadcast business channel.

That the identification information of the second port is port2 and the identification information of the second broadcast business channel is TCID2 is used as an example. The fourth mapping relationship may include port2 and TCID2.

Optionally, after configuring the second broadcast business channel for the second port, the basic service layer further stores a mapping relationship between the first broadcast business channel and the second broadcast business channel, so that the basic service layer of the second device transmits, through the second broadcast business channel, the first business data transmitted by the first device through the first broadcast business channel.

Optionally, the basic service layer determines a first access technology based on the first business requirement.

The basic service layer may further determine a logical channel type based on the first business requirement.

Optionally, the basic service layer further determines third indication information based on the first business requirement.

For descriptions of determining one or more of the first access technology, the logical channel type, and the third indication information by the basic service layer of the second device based on the first business requirement, refer to the related descriptions of determining the first access technology, the logical channel type, and the third indication information by the basic service layer of the first device based on the first business requirement in the foregoing step 503. This is not limited.

Optionally, the channel management module of the basic service layer performs the action or function performed by the basic service layer in the foregoing step 1106.

Step 1107: The basic service layer sends sixth information to the access layer. Correspondingly, the access layer receives the sixth information.

The sixth information may include the first business requirement, the identification information of the second broadcast business channel, the identification information of the first logical channel, and the logical channel type. The logical channel type indicates a type of a logical channel.

The sixth information may be used to request to configure, for the second broadcast business channel, a logical channel that meets the first business requirement and the logical channel type.

Specifically, after receiving the first business requirement delivered by the basic application layer, the basic service layer may abstract and process the first business requirement, to generate a first business requirement that can be parsed by the access layer, and deliver, to the access layer, the sixth information including the first business requirement that can be parsed by the access layer.

Optionally, the sixth information further includes second indication information, to request the access layer to configure, for the second broadcast business channel, a logical channel that meets the first access technology.

Optionally, the sixth information further includes the third indication information, so that the access layer determines, based on the third indication information, whether to configure, for the second broadcast business channel, a logical channel dedicated to transmission of the first business data.

Optionally, the channel management module of the basic service layer sends the sixth information to the access layer, so that the access layer configures a logical channel for the second broadcast business channel based on the sixth information.

Step 1108: The access layer determines a second logical channel based on the sixth information.

The access layer may configure, for the second broadcast business channel based on the first business requirement and the logical channel type that are in the sixth information, the logical channel that meets the first business requirement and the logical channel type. The logical channel may be the second logical channel.

Specifically, the access layer may create, reconfigure, or reuse the second logical channel based on the sixth information. For descriptions of determining the second logical channel by the access layer of the second device based on the sixth information, refer to the related descriptions of determining the first logical channel by the access layer of the first device based on the second information in the foregoing step 505. Details are not described again.

Optionally, after configuring the second logical channel for the second broadcast business channel, the access layer stores a third mapping relationship.

The third mapping relationship may include the identification information of the second broadcast business channel and identification information of a logical channel corresponding to the second broadcast business channel, that is, the third mapping relationship includes the identification information of the second broadcast business channel and identification information of the second logical channel.

That the identification information of the second broadcast business channel is TCID2 and the identification information of the second logical channel is LCID2 is used as an example. The third mapping relationship may include TCID2 and LCID2.

It should be noted that, when the access layer of the second device configures the second logical channel, the identification information of the second logical channel may be the same as the identification information of the first logical channel, or may be different from the identification information of the first logical channel. This is not limited.

Optionally, after configuring the second logical channel for the second broadcast business channel, the access layer further stores a mapping relationship between the first logical channel and the second logical channel, so that the access layer of the second device transmits, through the second logical channel, the first business data transmitted by the first device through the first logical channel.

Step 1109: The access layer sends the third mapping relationship to the basic service layer. Correspondingly, the basic service layer receives the third mapping relationship.

The third mapping relationship may include the identification information of the second broadcast business channel and the identification information of the second logical channel.

After receiving the third mapping relationship, the basic service layer may determine that the access layer has configured a corresponding logical channel for the second broadcast business channel, and the logical channel is the second logical channel.

Optionally, the access layer sends the third mapping relationship to the channel management module of the basic service layer.

Optionally, the method shown in FIG. 11 further includes the following step 11010.

Step 11010: The basic service layer sends the fourth mapping relationship to the basic application layer.

The fourth mapping relationship may include the identification information of the second port and the identification information of the second broadcast business channel.

After receiving the fourth mapping relationship, the basic application layer may determine that the basic service layer has configured a corresponding transmission channel for the second port, and the transmission channel is the second broadcast business channel.

Optionally, the channel management module of the basic service layer sends the fourth mapping relationship to the basic application layer.

Based on the method shown in FIG. 11, the second device may configure channels that are used to receive the broadcast business and that include the second port, the second broadcast business channel, and the second logical channel, so that the broadcast business is received through configured channels, and one-to-many broadcast business is implemented to meet a business requirement. In addition, the access layer of the second device may support a plurality of access technologies, so that flexibility of transmission of the broadcast business can be improved.

Further, after completing channel configuration by using the method shown in FIG. 11, the second device may further receive, by using a method shown in FIG. 12, the first business data broadcast by the first device.

FIG. 12 shows a business data transmission method according to an embodiment of this application. As shown in FIG. 12, the method may be applied to a second device, and the method may include the following steps.

Step 1201: An access layer obtains first business data.

The access layer may receive the first business data by using a first access technology.

In a first example, that the first access technology is an SLE access technology is used as an example. Refer to the descriptions of the SLE access technology in FIG. 8. The access layer of the second device may obtain, through scanning a broadcast channel, a broadcast message that is broadcast by an access layer of a first device and that includes fourth information. Therefore, a time-frequency resource for a broadcast packet is determined based on first time-frequency pointer information in the broadcast message, and the broadcast packet is received through a business channel on a time-frequency resource indicated by the first time-frequency pointer information. Then, a time-frequency resource for the first business data is determined based on second time-frequency pointer information in the broadcast packet, and a business broadcast packet including the first business data is received through the business channel on a time-frequency resource indicated by the second time-frequency pointer information, so as to determine the first business data.

In a second example, that the first access technology is an SLB access technology is used as an example. Refer to the descriptions of the SLB access technology in FIG. 9. The access layer of the second device may receive, on a fixed time-frequency resource, SIB information sent by an access layer of a first device, and determine, based on search space in the SIB information, a time-frequency resource on which downlink dynamic scheduling information may be located. The downlink dynamic scheduling information may be used to schedule downlink data (for example, the first business data). Then, the second device may blindly detect the downlink dynamic scheduling information through the search space to obtain a physical resource on which the first business data is located, and then parse the first business data on the corresponding physical resource.

It should be noted that the second device may complete synchronization with the first device based on the fourth information. After the synchronization is completed, the access layer of the second device may not need to receive the fourth information, that is, after completing synchronization with the first device, the second device may directly receive the first business data.

Step 1202: The access layer sends the first business data to a basic service layer.

The access layer may transmit the first business data through a second logical link, to send the first business data to the basic service layer.

Step 1203: The basic service layer sends the first business data to a basic application layer.

The basic service layer may transmit the first business data through a second broadcast business channel, and send the first business data to the basic application layer through a second port.

Based on the method shown in FIG. 12, the access layer, the basic service layer, and the basic application layer of the second device may complete receiving of the first business data sequentially through configured channels that include a second logical channel, the second broadcast business channel, and the second port.

In embodiments of this application, the channels configured by the second device may be used to receive broadcast business, and overall business is not completed based on establishment of a connection between a broadcasting party communication device and a scanning party communication device. As shown in FIG. 10, the second device may receive the broadcast business based on the configured channel.

Further, based on the channel configuration method and the business data transmission method shown in FIG. 5 to FIG. 12, the first device may further stop broadcasting the identification information of the first broadcast business channel at any moment of the broadcast business by using a method shown in FIG. 13. Then, no new scanning party communication device (the second device) configures a channel based on the first broadcast business channel and receives the first business data.

FIG. 13 shows a broadcast stop method according to an embodiment of this application. As shown in FIG. 13, the method may be applied to a first device, and the method may include the following steps.

Step 1301: A basic application layer sends fifth indication information to a basic service layer.

The fifth indication information may indicate to stop broadcasting identification information of a first broadcast business channel.

Step 1302: The basic service layer sends the fifth indication information to an access layer.

Step 1303: The access layer stops broadcasting fourth information.

The access layer may stop, based on the fifth indication information, broadcasting the fourth information that includes the identification information of the first broadcast business channel.

Optionally, the method shown in FIG. 13 further includes the following step 1304 and step 1305.

Step 1304: The access layer sends, to the basic service layer, indication information indicating that broadcasting of the identification information of the first broadcast business channel is stopped.

Step 1305: The basic service layer sends, to the basic application layer, the indication information indicating that broadcasting of the identification information of the first broadcast business channel is stopped.

Based on the method shown in FIG. 13, the basic service layer may send the fifth indication information sent by the basic application layer to the access layer, so that the access layer stops broadcasting the identification information of the first broadcast business channel. Then, no new scanning party communication device configures a channel based on the first broadcast business channel and receives first business data. It should be noted that, after the access layer stops broadcasting the identification information of the first broadcast business channel, a scanning party communication device that has been configured with a channel may still receive, on a configured channel, the first business data broadcast by the first device through a channel configured by the first device.

Figure 14:
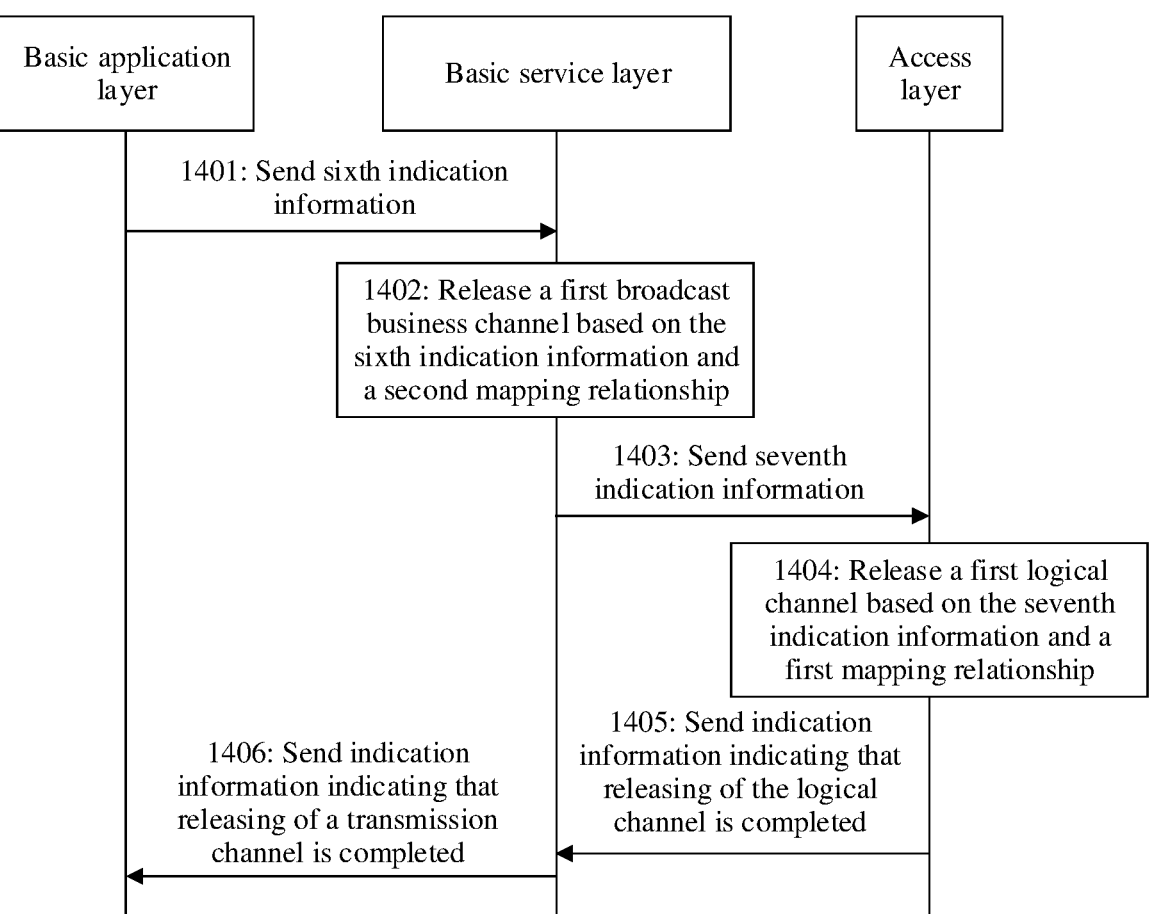
FIG. 14 is a flowchart of a channel release method according to an embodiment of this application.

Further, based on the channel configuration method and the business data transmission method shown in FIG. 5 to FIG. 12, the first device may further release the channel configured by the first device by using a method shown in FIG. 14.

FIG. 14 shows a channel release method according to an embodiment of this application. As shown in FIG. 14, the method may be applied to a first device, and the method may include the following steps.

Step 1401: A basic application layer sends sixth indication information to a basic service layer.

The sixth indication information may indicate to release a transmission channel corresponding to a first port, and the sixth indication information may include identification information of the first port.

Optionally, after the basic service layer sends a second mapping relationship to the basic application layer based on the foregoing step 507, when the basic application layer sends the sixth indication information to the basic service layer, the basic application layer deletes the second mapping relationship.

Step 1402: The basic service layer releases a first broadcast business channel based on the sixth indication information and the second mapping relationship.

Because one or more ports of the basic application layer may correspond to a same transmission channel of the basic service layer, when ports corresponding to the first broadcast business channel include only the first port, the basic service layer may delete the first broadcast business channel and the second mapping relationship, or the basic service layer may delete the second mapping relationship, so as to complete releasing of the first broadcast business channel. When ports corresponding to the first broadcast business channel further include another port in addition to the first port, the basic service layer may delete the second mapping relationship, so as to complete releasing of the first broadcast business channel.

Step 1403: The basic service layer sends seventh indication information to an access layer.

The seventh indication information may indicate to release a logical channel corresponding to the first broadcast business channel, and the seventh indication information may include identification information of the first broadcast business channel.

Step 1404: The access layer releases a first logical channel based on the seventh indication information and a first mapping relationship.

Because one or more transmission channels of the basic service layer may correspond to a same logical channel of the access layer, when transmission channels corresponding to the first logical channel include only the first broadcast business channel, the access layer may delete the first logical channel and the first mapping relationship, or the access layer may delete the first mapping relationship, so as to complete releasing of the first logical channel. When transmission channels corresponding to the first logical channel further include another transmission channel in addition to the first broadcast business channel, the access layer may delete the first mapping relationship, so as to complete releasing of the first logical channel.

Optionally, the method shown in FIG. 14 further includes the following step 1405 and step 1406.

Step 1405: The access layer sends, to the basic service layer, indication information indicating that releasing of the logical channel is completed.

Step 1406: The basic service layer sends, to the basic application layer, indication information indicating that releasing of the transmission channel is completed.

Based on the method shown in FIG. 14, when the first device determines that transmission of broadcast business needs to be stopped, the basic service layer may release, based on the sixth indication information sent by the basic application layer and the second mapping relationship, the first broadcast business channel corresponding to the first port. The basic service layer may further send the seventh indication information to the access layer, so that the access layer releases the first logical channel based on the seventh indication information and the first mapping relationship.

It should be noted that the method shown in FIG. 13 and the method shown in FIG. 14 may be used independently, or may be used in combination. This is not limited.

Figure 15:
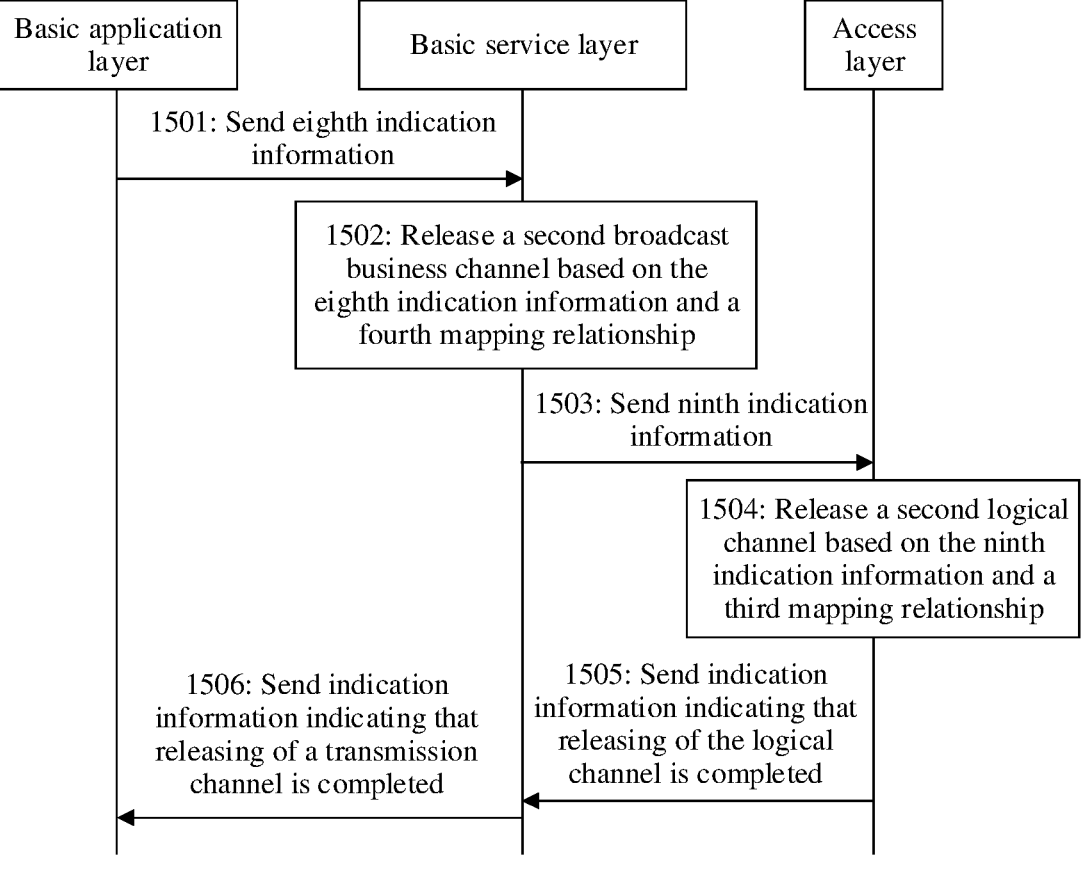
FIG. 15 is a flowchart of a channel release method according to an embodiment of this application.

Corresponding to releasing of the channel by the first device in FIG. 14, when a second device no longer needs to receive the broadcast business, the second device may release a configured channel by using a method shown in FIG. 15.

FIG. 15 shows a channel release method according to an embodiment of this application. As shown in FIG. 15, the method may be applied to a second device, and the method may include the following steps.

Step 1501: A basic application layer sends eighth indication information to a basic service layer.

The eighth indication information may indicate to release a transmission channel corresponding to a second port, and the eighth indication information may include identification information of the second port.

Optionally, after the basic service layer sends a fourth mapping relationship to the basic application layer, when the basic application layer sends the eighth indication information to the basic service layer, the basic application layer may delete the fourth mapping relationship.

Step 1502: The basic service layer releases a second broadcast business channel based on the eighth indication information and the fourth mapping relationship.

Because one or more ports of the basic application layer may correspond to a same transmission channel of the basic service layer, when a port corresponding to the second broadcast business channel includes only the second port, the basic service layer may delete the second broadcast business channel and the fourth mapping relationship, or the basic service layer may delete the fourth mapping relationship, so as to complete releasing of the second broadcast business channel. When ports corresponding to the second broadcast business channel further include another port in addition to the second port, the basic service layer may delete the fourth mapping relationship, so as to complete releasing of the second broadcast business channel.

Step 1503: The basic service layer sends ninth indication information to an access layer.

The ninth indication information may indicate to release a logical channel corresponding to the second broadcast business channel, and the ninth indication information may include identification information of the second broadcast business channel.

Step 1504: The access layer releases a second logical channel based on the ninth indication information and a third mapping relationship.

Because one or more transmission channels of the basic service layer may correspond to a same logical channel of the access layer, when a transmission channel corresponding to the second logical channel includes only the second broadcast business channel, the access layer may delete the second logical channel and the third mapping relationship, or the access layer may delete the third mapping relationship, so as to complete releasing of the second logical channel. When transmission channels corresponding to the second logical channel further include another transmission channel in addition to the second broadcast business channel, the access layer may delete the third mapping relationship, so as to complete releasing of the second logical channel.

Optionally, the method shown in FIG. 15 further includes the following step 1505 and step 1506.

Step 1505: The access layer sends, to the basic service layer, indication information indicating that releasing of the logical channel is completed.

Step 1506: The basic service layer sends, to the basic application layer, indication information indicating that releasing of the transmission channel is completed.

Based on the method shown in FIG. 15, when the second device determines that receiving of broadcast business needs to be stopped, the basic service layer may release, based on the eighth indication information sent by the basic application layer and the fourth mapping relationship, the second broadcast business channel corresponding to the second port. The basic service layer may further send the ninth indication information to the access layer, so that the access layer releases the second logical channel based on the ninth indication information and the third mapping relationship.

The foregoing mainly describes the solutions provided in embodiments of this application from a perspective of interaction between the devices. It may be understood that, to implement the foregoing functions, the devices include corresponding hardware structures and/or software modules for performing the functions. A person of ordinary skill in the art should easily be aware that, in combination with algorithms and steps in the examples described in embodiments disclosed in this specification, this application can be implemented by hardware or a combination of hardware and computer software. Whether a function is implemented by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the devices may be divided into functional modules based on the foregoing method examples. For example, each functional module may be obtained through division based on each corresponding function, or two or more functions may be integrated into one processing module. The foregoing integrated module may be implemented in a form of hardware, or may be implemented in a form of a software functional module. It should be noted that, in embodiments of this application, module division is an example, and is merely logical function division. During actual implementation, another division manner may be used.

Figure 16:
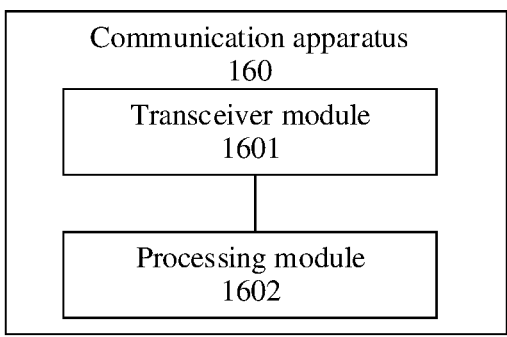
FIG. 16 is a schematic diagram of composition of a communication apparatus according to an embodiment of this application.

When each functional module is obtained through division based on each corresponding function, FIG. 16 shows a communication apparatus 160. When the communication apparatus 160 is located in a broadcasting party communication device, the communication apparatus 160 may perform an action performed by the basic service layer of the first device in FIG. 6 to FIG. 15. When the communication apparatus 160 is used as a scanning party communication device, the communication apparatus 160 may perform an action performed by the basic service layer of the second device in FIG. 5 to FIG. 15.

The communication apparatus 160 may include a transceiver module 1601 and a processing module 1602. For example, the communication apparatus 160 may be a communication apparatus, or may be a chip used in the communication apparatus, or another combined device, component, or the like that has a function of the foregoing communication apparatus. When the communication apparatus 160 is the communication apparatus, the transceiver module 1601 may be a transceiver, and the transceiver may include an antenna, a radio frequency circuit, and the like. The processing module 1602 may be a processor (or a processing circuit), for example, a baseband processor. The baseband processor may include one or more CPUs. When the communication apparatus 160 is the component that has the function of the foregoing communication apparatus, the transceiver module 1601 may be a radio frequency unit. The processing module 1602 may be a processor (or a processing circuit), for example, a baseband processor. When the communication apparatus 160 is a chip system, the transceiver module 1601 may be an input/output interface of a chip (for example, a baseband chip). The processing module 1602 may be a processor (or a processing circuit) of the chip system, and may include one or more central processing units. It should be understood that, in this embodiment of this application, the transceiver module 1601 may be implemented by a transceiver or a transceiver-related circuit component; and the processing module 1602 may be implemented by a processor or a processor-related circuit component (or referred to as a processing circuit).

For example, the transceiver module 16oi may be configured to perform all receiving and sending operations performed by the communication apparatus in the embodiments shown in FIG. 5 to FIG. 15, and/or configured to support another process of the technology described in this specification. The processing module 1602 may be configured to perform all operations performed by the communication apparatus in the embodiments shown in FIG. 5 to FIG. 15 other than the receiving and sending operations, and/or configured to support another process of the technology described in this specification.

In another possible implementation, in FIG. 16, the transceiver module 1601 may be replaced with a transceiver, and the transceiver may integrate a function of the transceiver module 1601; and the processing module 1602 may be replaced with a processor, and the processor may integrate a function of the processing module 1602. Further, the communication apparatus 160 shown in FIG. 16 may further include a memory. When the transceiver module 1601 is replaced with the transceiver, and the processing module 1602 is replaced with the processor, the communication apparatus 160 in this embodiment of this application may be the communication apparatus shown in FIG. 4.

An embodiment of this application further provides a computer-readable storage medium. All or some of the procedures in the foregoing method embodiments may be implemented by a computer program instructing related hardware. The program may be stored in the computer-readable storage medium. When the program is run, the procedures of the foregoing method embodiments can be implemented. The computer-readable storage medium may be an internal storage unit of the terminal (which includes a data transmit end and/or a data receive end) in any one of the foregoing embodiments, for example, a hard disk or a memory of the terminal. The computer-readable storage medium may alternatively be an external storage device of the terminal, for example, a plug-in hard disk, a smart media card (SMC), a secure digital (SD) card, or a flash card provided on the terminal. Further, the computer-readable storage medium may alternatively include both the internal storage unit and the external storage device of the terminal. The computer-readable storage medium is configured to store the computer program and another program and data that are needed by the terminal. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

Based on the descriptions of the foregoing implementations, it may be clearly understood by a person skilled in the art that, for ease and brevity of description, division of the foregoing functional modules is merely used as an example for description. In actual application, the foregoing functions may be allocated to different functional modules for implementation according to a requirement, that is, an internal structure of the apparatus is divided into different functional modules, to implement all or some of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to a first device, the method comprising:

receiving, by a basic service layer of the first device, first information from a basic application layer of the first device, wherein the first information comprises a first service requirement and identification information of a first port;

sending, by the basic service layer, second information to an access layer of the first device, wherein the second information comprises the first service requirement, identification information of a first broadcast channel, and a logical channel type, the first broadcast channel is a transmission channel determined based on the first information, the logical channel type indicates a type of a logical channel, the access layer supports a first access technology, and the first access technology is determined from a plurality of access technologies based on the first service requirement;

receiving, by the basic service layer, a first mapping relationship from the access layer, wherein the first mapping relationship comprises the identification information of the first broadcast channel and identification information of a first logical channel, and the first logical channel is a logical channel that supports the first access technology and that is determined based on the second information; and storing, by the basic service layer, a second mapping relationship, wherein the second mapping relationship comprises the identification information of the first broadcast channel and the identification information of the first port.

2. The method according to claim 1, wherein:

the first information further comprises: a transmission channel type or first indication information, wherein the transmission channel type indicates that a type of the transmission channel is a broadcast channel, and the first indication information indicates whether the transmission channel is dedicated to transmission of first service data.

3. The method according to claim 1, wherein before sending, by the basic service layer, the second information to the access layer, the method further comprises:

establishing, by the basic service layer, the first broadcast channel based on the first information;

reconfiguring, by the basic service layer, the first broadcast channel based on the first information; or reusing, by the basic service layer, the first broadcast channel based on the first information.

4. The method according to claim 1, wherein:

the second information further comprises second indication information or third indication information, wherein the second indication information indicates the first access technology, and the third indication information indicates whether the logical channel is dedicated to transmission of first service data.

5. The method according to claim 1, wherein the method further comprises:

receiving, by the basic service layer, third information from the basic application layer, wherein the third information comprises first information, the identification information of the first port, and the identification information of the first broadcast channel;

sending, by the basic service layer, fourth information to the access layer, wherein the fourth information comprises the first information, the identification information of the first port, the identification information of the first broadcast channel, and the identification information of the first logical channel;

receiving, by the basic service layer, fourth indication information from the access layer, wherein the fourth indication information indicates that the access layer has completed broadcasting of the fourth information; and sending, by the basic service layer, the fourth indication information to the basic application layer.

6. The method according to claim 5, wherein:

the first information comprises a service environment type, a service environment name, or a description of a service environment corresponding to first service data.

7. The method according to claim 5, wherein the method further comprises:

receiving, by the basic service layer, first service data from the basic application layer through the first port; and sending, by the basic service layer, the first service data to the access layer through the first broadcast channel, to enable the access layer to broadcast the first service data through the first logical channel.

8. The method according to claim 5, wherein the method further comprises:

receiving, by the basic service layer, fifth indication information from the basic application layer, wherein the fifth indication information indicates to stop broadcasting the identification information of the first broadcast channel; and sending, by the basic service layer, the fifth indication information to the access layer.

9. The method according to claim 1, wherein the method further comprises:

receiving, by the basic service layer, sixth indication information from the basic application layer, wherein the sixth indication information indicates to release a transmission channel corresponding to the first port;

releasing, by the basic service layer, the first broadcast channel based on the sixth indication information and the second mapping relationship; and sending, by the basic service layer, seventh indication information to the access layer, wherein the seventh indication information indicates to release a logical channel corresponding to the first broadcast channel, so that the access layer releases the first logical channel based on the seventh indication information and the first mapping relationship.

10. A communication apparatus, wherein the communication apparatus comprises:

one or more processors;

a communication interface, the communication interface is coupled to the processor; and one or more memories coupled to the one or more processors and storing programming instructions for execution by the one or more processors to cause the communication apparatus to perform the following operations:

receiving, first information from a basic application layer, wherein the first information comprises a first service requirement and identification information of a first port;

sending, second information to an access layer, wherein the second information comprises the first service requirement, identification information of a first broadcast channel, and a logical channel type, the first broadcast channel is a transmission channel determined based on the first information, the logical channel type indicates a type of a logical channel, the access layer supports a first access technology, and the first access technology is determined from a plurality of access technologies based on the first service requirement;

receiving, a first mapping relationship from the access layer, wherein the first mapping relationship comprises the identification information of the first broadcast channel and identification information of a first logical channel, and the first logical channel is a logical channel that supports the first access technology and that is determined based on the second information; and storing, a second mapping relationship, wherein the second mapping relationship comprises the identification information of the first broadcast channel and the identification information of the first port.

11. The communication apparatus according to claim 10, wherein:

the first information further comprises: a transmission channel type or first indication information, wherein the transmission channel type indicates that a type of the transmission channel is a broadcast channel, and the first indication information indicates whether the transmission channel is dedicated to transmission of first service data.

12. The communication apparatus according to claim 10, wherein the one or more memories stores programming instructions for execution by the one or more processors to cause the apparatus to further perform the following operations:

establishing, the first broadcast channel based on the first information;

reconfiguring, the first broadcast channel based on the first information; or reusing, the first broadcast channel based on the first information.

13. The communication apparatus according to claim 10, wherein the second information further comprises one or more of the following: second indication information or third indication information, wherein the second indication information indicates the first access technology, and the third indication information indicates whether the logical channel is dedicated to transmission of first service data.

14. The communication apparatus according to claim 10, wherein the one or more memories stores programming instructions for execution by the one or more processors to cause the apparatus to further perform the following operations:

receiving, third information from the basic application layer, wherein the third information comprises first information, the identification information of the first port, and the identification information of the first broadcast channel;

sending, fourth information to the access layer, wherein the fourth information comprises the first information, the identification information of the first port, the identification information of the first broadcast channel, and the identification information of the first logical channel;

receiving, fourth indication information from the access layer, wherein the fourth indication information indicates that the access layer has completed broadcasting of the fourth information; and sending, the fourth indication information to the basic application layer.

15. The communication apparatus according to claim 14, wherein the first information comprises one or more of the following: a service environment type, a service environment name, or a description of a service environment corresponding to first service data.

16. The communication apparatus according to claim 14, wherein the one or more memories stores programming instructions for execution by the one or more processors to cause the apparatus to further perform the following operations:

receiving, first service data from the basic application layer through the first port; and sending, the first service data to the access layer through the first broadcast channel, to enable the access layer to broadcast the first service data through the first logical channel.

17. The communication apparatus according to claim 14, wherein the one or more memories stores programming instructions for execution by the one or more processors to cause the apparatus to further perform the following operations:

receiving, fifth indication information from the basic application layer, wherein the fifth indication information indicates to stop broadcasting the identification information of the first broadcast channel; and sending, the fifth indication information to the access layer.

18. The communication apparatus according to claim 10, wherein the one or more memories stores programming instructions for execution by the one or more processors to cause the apparatus to further perform the following operations:

receiving, sixth indication information from the basic application layer, wherein the sixth indication information indicates to release a transmission channel corresponding to the first port;

releasing, the first broadcast channel based on the sixth indication information and the second mapping relationship; and sending, seventh indication information to the access layer, wherein the seventh indication information indicates to release a logical channel corresponding to the first broadcast channel, so that the access layer releases the first logical channel based on the seventh indication information and the first mapping relationship.

19. A non-transitory computer-readable storage medium, wherein the non-transitory computer-readable storage medium stores computer instructions or a computer program, and when the computer instructions or the computer program is run on a computer, the following operations are performed:

receiving, first information from a basic application layer, wherein the first information comprises a first service requirement and identification information of a first port;

sending, second information to an access layer, wherein the second information comprises the first service requirement, identification information of a first broadcast channel, and a logical channel type, the first broadcast channel is a transmission channel determined based on the first information, the logical channel type indicates a type of a logical channel, the access layer supports a first access technology, and the first access technology is determined from a plurality of access technologies based on the first service requirement;

receiving, a first mapping relationship from the access layer, wherein the first mapping relationship comprises the identification information of the first broadcast channel and identification information of a first logical channel, and the first logical channel is a logical channel that supports the first access technology and that is determined based on the second information; and storing, a second mapping relationship, wherein the second mapping relationship comprises the identification information of the first broadcast channel and the identification information of the first port.

20. The non-transitory computer-readable storage medium according to claim 19, wherein the first information further comprises: a transmission channel type or first indication information, wherein the transmission channel type indicates that a type of the transmission channel is a broadcast channel, and the first indication information indicates whether the transmission channel is dedicated to transmission of first service data.

* * * * *